USOO5303153A

United States Patent [19]
Sakai et al.

[11] Patent Number: 5,303,153
[45] Date of Patent: Apr. 12, 1994

[54] VEHICLE AUTOMATIC TRANSMISSION CONTROL SYSTEM

[75] Inventors: Ichiro Sakai; Yasuhisa Arai; Yusuke Hasegawa; Shinichi Sakaguchi, all of Saitama, Japan

[73] Assignee: Honda Giken Kogyo Kabushiki Kaisha, Tokyo, Japan

[21] Appl. No.: 691,066

[22] Filed: Apr. 24, 1991

[30] Foreign Application Priority Data

Apr. 27, 1990 [JP] Japan ................... 2-112816

[51] Int. Cl.[5] .......................... B60K 41/06
[52] U.S. Cl. ..................... 364/424.1; 74/866; 74/869; 364/426.04
[58] Field of Search .......... 364/424.1, 426.04; 74/866, 869

[56] References Cited

U.S. PATENT DOCUMENTS

| | | | |
|---|---|---|---|
| 3,823,621 | 7/1974 | Kubo et al. | 74/866 |
| 4,688,452 | 8/1987 | Aoyama et al. | 74/869 |
| 4,841,815 | 6/1989 | Takahashi | 364/424.1 |
| 4,930,084 | 5/1990 | Hosaka et al. | 364/426.04 |
| 5,036,730 | 8/1991 | Sakai et al. | 364/424.1 |
| 5,067,374 | 11/1991 | Sakai et al. | 364/424.1 |
| 5,079,705 | 1/1992 | Sakai et al. | 364/424.1 |
| 5,101,350 | 3/1992 | Tokoro | 364/424.1 |

FOREIGN PATENT DOCUMENTS 0347261 12/1989 European Pat. Off. .
0347263 12/1989 European Pat. Off. .

Primary Examiner—Thomas G. Black
Assistant Examiner—Jacques H. Louis-Jacques
Attorney, Agent, or Firm—Lyon & Lyon

[57] ABSTRACT

Vehicle automatic transmission control system in which based on the determined operating parameters of the vehicle including degree of throttle opening, vehicle speed or the like, a plurality of sets of membership functions of the parameters are established in accordance with a plurality of sets of predetermined fuzzy production rules. Fuzzy reasoning is carried out on the sets of the rules to determine a target gear ratio to shift to. The plural sets of the rules are predetermined hierarchically. One category of rules is directed toward the entire area of shift control, whereas another category of rules is directed toward a specific shift control area such as hill climbing. Further an additional category of rules is provided to presume the driver's intentional condition such as an intention to decelerate. Based on the last category of rules, fuzzy reasoning is carried out to determine the intentional condition. The condition thus obtained is added to the first-mentioned parameters and the second fuzzy reasoning is carried out to determine the target gear ratio on the basis of the first and second category of rules.

26 Claims, 26 Drawing Sheets

FIG.5

| Rule number | Rule type | Subject | Antecedent | | | Conclusion | Rule meaning |
|---|---|---|---|---|---|---|---|
| 1 | Basic rule | Ordinary driving | (V km/h, 0→130→250) | (Gear position So, 1→4) | | (-3-2-1 0 1 2 3) | If the vehicle speed is high and the gear position is low (the gear ratio is large), then shift the gear position up greatly (lower the gear ratio greatly). |
| 2 | " | " | (V, 0→130→250) | (Gear position So, 1→4) | | (-3) | If the vehicle speed is low and the gear position is high (the gear ratio is small), then shift the gear position down greatly (raise the gear ratio greatly). |
| 3 | " | " | (θTH, 0→84 deg) | (V, 0→250) | | (3) | If the degree of throttle opening is small and the vehicle speed is high, then shift the gear position up greatly (lower the gear ratio greatly). |
| 4 | " | " | (θTH, 0→84) | (V, 0→250) | | (1) | If the degree of throttle opening is small and the vehicle speed is low, then shift the gear position up slightly (lower the gear ratio slightly). |
| 5 | " | " | (θTH, 0→84) | (V, 0→250) | | (-1) | If the degree of throttle opening is large and the vehicle speed is high, then shift the gear position down slightly (raise the gear ratio slightly). |
| 6 | " | " | (θTH, 0→84) | (V, 0→250) | | (-3) | If the degree of throttle opening is large and the vehicle speed is low, then shift the gear position down greatly (raise the gear ratio greatly). |

FIG. 6

| Rule number | Rule type | Subject | Antecedent | | | Conclusion | Rule meaning |
|---|---|---|---|---|---|---|---|
| 7 | Extra rule | Hill-climbing | Driving resistance R/L (100, 192 (kg)) | θTH (0, 84 (deg)) | V (km/h) (20, 40, 250) | -3-2-1 0 1 2 3 | During hill-climbing if the degree of throttle opening is small, then do not shift the gear position (do not raise or lower the gear ratio). |
| 8 | " | " | (arrow) | θTH (0, 84) | (arrow) | -3 | During hill-climbing if the gear position is high (the gear ratio is low) and the degree of throttle opening is large, then promptly shift the gear position down (raise the gear ratio). |
| 9 | " | Hill-descent | Driving resistance R/L (-128, 0) | θTH (0, 10.5, 84) | | -3 | If vehicle is traveling down hill, then shift the gear position down (raise the gear ratio) to produce engine braking effect. |
| 10 | " | Deceleration | Intention to decelerate (0, 1) | | | -3 | If driver has intention to decelerate and the gear position is high (the gear ratio is low), then shift the gear position down (raise the gear ratio) to produce engine braking effect. |
| 11 | " | Deceleration | Intention to decelerate (0, 1) | | | 0 | If driver has intention to decelerate and the gear position is third gear (the gear ratio is somewhat large), then hold the gear position (gear ratio) to maintain engine braking effect. |

FIG. 7

| Rule number | Rule type | Subject | Antecedent | | | | Conclusion | Rule meaning |
|---|---|---|---|---|---|---|---|---|
| 12 | Extra rule | Intention to decelerate | 0.7 at 0–16.5–84(deg) θ_TH | 0.7 at −0.1 −0.05 (m/s²) α | 1.0 at −40 −20 0 V_BRK | | 0.7 at −0.06 0 0.06 | If the accelerator pedal is released, the brake pedal is depressed, the vehicle speed is decreasing and the rate of acceleration is negative, then the intention to decelerate is increasing. |
| 13 | " | " | 0.3 at 0 31.5 84 θ_TH | | | | 0.3 at −0.06 0 0.06 | If the accelerator pedal is depressed, then the intention to decelerate is decreasing. |

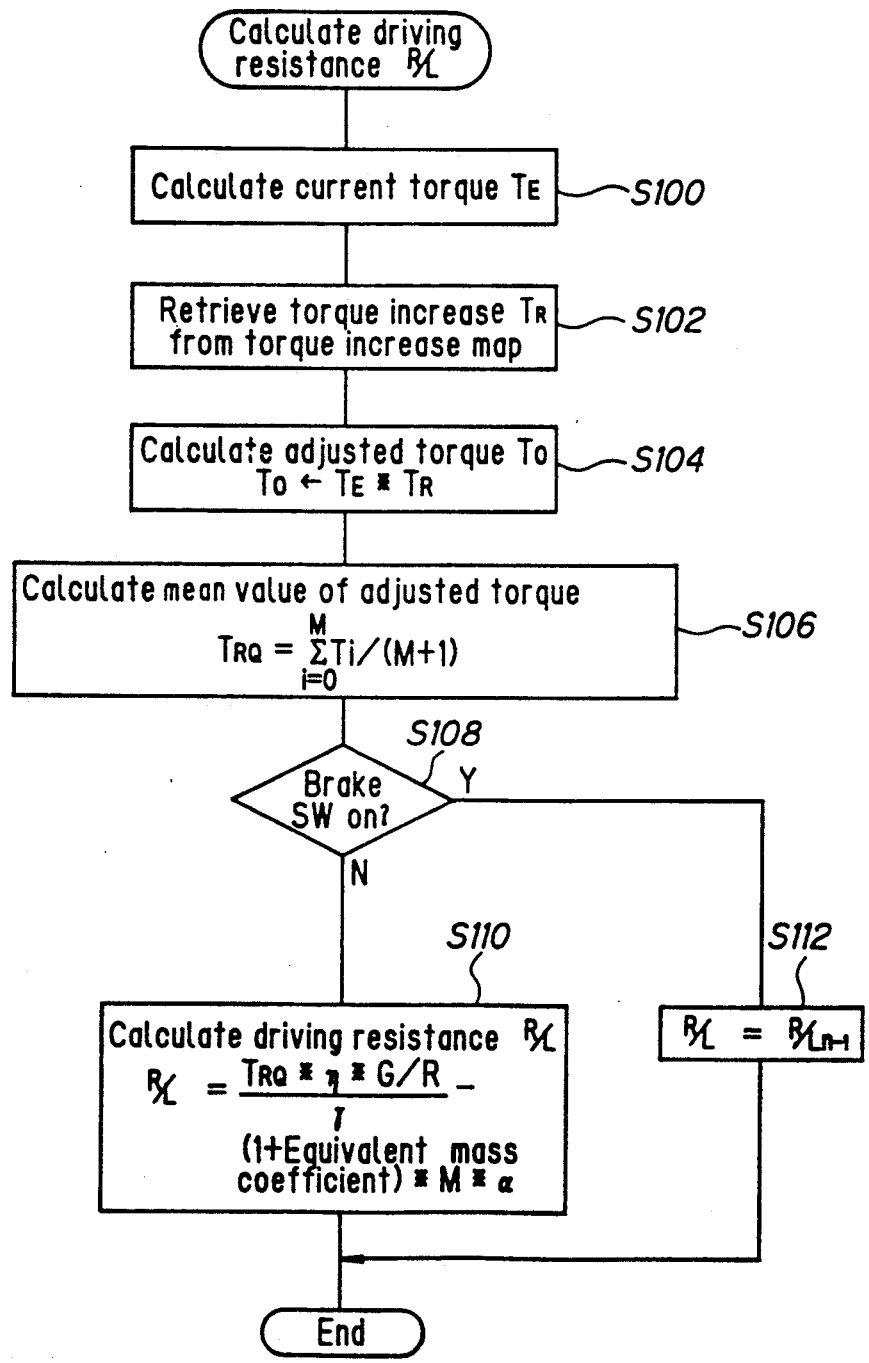

FIG. 11

| Para-meters | Parameter number | Function number | Membership value |
|---|---|---|---|
| Vehicle speed V | 1 | 0.3 ⟋ 1 | 0.3 |
| | | 0.7 ⟍ 2 | 0.7 |
| | | 0.5 ⟋ 3 | 0.5 |
| | | 4 | |
| Degree of throttle opening θTH | 2 | 0.6 ⟍ 5 | 0.6 |
| | | 0.3 ⟋ 6 | 0.3 |
| | | 1.0 △ 7 | 1.0 |
| | | ⟋⟍ 8 | 0 |
| Gear position So | 3 | ⟍ 9 | . |
| | | 10 | . |
| | | 11 | . |
| | | | . |
| | ⋮ | ⋮ | ⋮ |
| | 19 | 76 | |

FIG. 21

FIG. 34
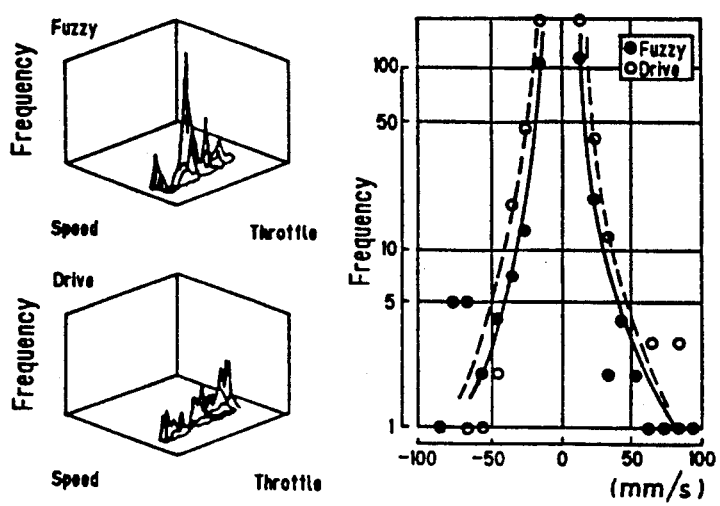
FIG. 35
| Driver | A | B | C | Average |
|---|---|---|---|---|
| Fuzzy | 24 | 18 | 16 | 19.3 |
| Drive | 29 | 27 | 26 | 27.3 |
FIG. 36
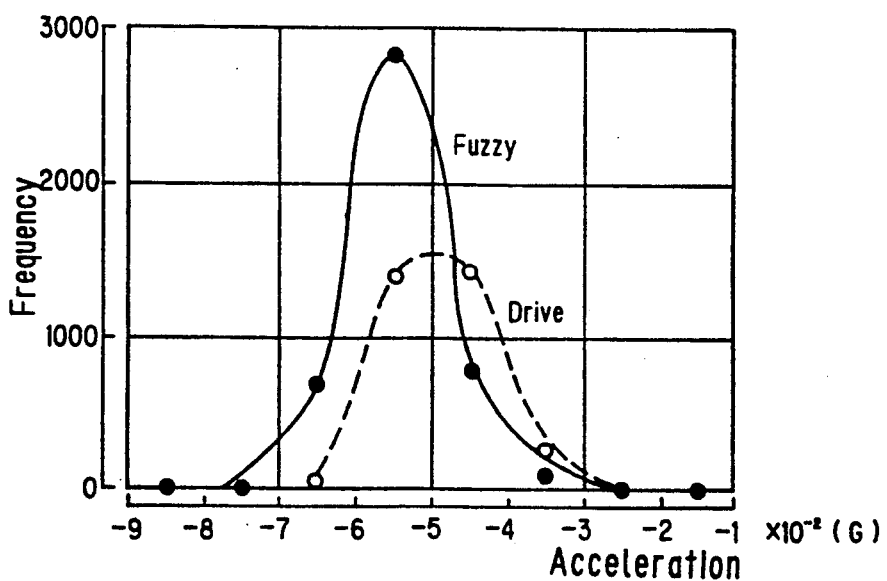

VEHICLE AUTOMATIC TRANSMISSION CONTROL SYSTEM

BACKGROUND OF THE INVENTION

1. Field of the Invention

This invention relates to a vehicle automatic transmission control system, and more particularly to a vehicle automatic transmission control system which applies fuzzy logic in such a way as to allow a multi-step or continuously variable transmission to respond and to be controlled in a manner resembling response and control based on the judgments and operations of an expert driver in the case of a conventional manually controlled vehicle transmission and which thus provides response and control that is well matched to human feelings.

2. Description of the Prior Art

In a conventional automatic transmission the time for changing gears is determined on the basis of the vehicle speed and the degree of throttle opening. More often than not the control system for carrying out this control employs a microcomputer. While control by microcomputer is superior to that by human operation in terms of speed and the volume of information that can be handled, it is often inferior to that of an expert driver in terms of quality, and for this reason has not been fully satisfactory. This is because when driving a vehicle with a manual transmission the driver does not decide to shift gears based solely on the vehicle speed and the degree of throttle opening but also takes into consideration a wide range of surrounding circumstances including the inclination of the road surface and the like. The driver then makes his decision as to whether or not to shift gears on the basis of various rules he has learned through his driving experience. For example, when driving up hill the driver decides when to shift gears taking into consideration the amount of reserve engine power available, and the more experienced he is, the more capable he will be of selecting the best gear to shift to. In the conventional automatic transmission, on the other hand, since the control or a response is based solely on the vehicle speed and the degree of throttle opening, gear changing tends to be carried out unnecessarily and repeatedly during hill-climbing, which degrades the riding comfort. Moreover, as the driving conditions change, such as when entering an uphill or downhill driving situation, the conventional automatic transmission control does no give sufficient attention to quality factors such as riding comfort, safety and fuel efficiency, which are considered important in evaluating driving performance. This has become an increasingly important problem in recent years since people no longer consider vehicles to be mere means of transportation for getting them from one place to another but want a vehicle that provides operability and performance characteristics matched to human sensibilities. There is thus a strong desire for the qualitative improvements that conventional control systems are unable to provide, and on which conventional automatic transmission control systems have been less than satisfactory.

When observing the human decision making process, it is found that a parson first acquires a general grasp of a situation, then makes a decision and acts. This process, which involves recognition, judgment, decision and action, enables the person to act or respond in a highly suitable manner notwithstanding that his or her grasp of the situation is general and imprecise.

Over the past few years, fuzzy control has come into the spotlight as a control method capable of simulating the imprecise behavior pattern of human beings. One application of such control is seen, for example, in Japanese Laid-open Patent Publication No. 63(1968)-246546 which was filed in the United States and is now matured to Patent under the number of U.S. Pat. No. 4,841,815, relating to an automatic transmission control system using fuzzy control.

Fuzzy reasoning falls into two categories including one based on fuzzy production rules and one based on fuzzy relationships. The control system disclosed in the above-mentioned publication uses reasoning by fuzzy relationships for deciding an appropriate gear ratio.

Reasoning by fuzzy relationships deals with a model expressed as complex relationships involving various fuzzy relationships connected in series and parallel. This form of reasoning is suitable for troubleshooting and other types of backward reasoning but is not appropriate for foreword reasoning which requires control values to be determined through the analysis of current phenomena. In contrast, fuzzy reasoning by rules uses a model expressed on the control side in terms of "If . . ., then . . . ," permitting the aforesaid human behavior pattern to be easily expressed and the creation of a knowledge base to be facilitated. As this mode of reasoning also makes it possible to formulate rules in the manner of a dialogue, it enables the control know-how acquired through the experience of an expert driver to be incorporated with increased accuracy so that control and response matched to human feelings can be more readily realized. Moreover, modifications in the control are easy to implement.

It was because of these advantages that the applicant proposed an automatic transmission control system based on production rules in Japanese Laid-open Patent Publication No. 2(1990)-85563 which was filed in the United States and is now being allowed. However, since the rules in this earlier system are uni-dimensionally enumerated, the number of rules is large and there remains room for improvement, particularly through modifications on the control side and other measures for increasing system simplicity.

SUMMARY OF THE INVENTION

An object of this invention is, therefore, to provide a vehicle automatic transmission control system that uses reasoning by production rules and incorporates the control know-how acquired through experience by an expert driver into the control side, thereby realizing control which results in superior drivability and is matched to human feelings.

Another object of this invention is to provide a vehicle automatic transmission control system which enables the control side to be formulated for the specific purpose at hand, thereby minimizing the number of required rules and simplifying the arithmetic and logical operations, realizing a simple arrangement with excellent response, and facilitating adaptation of the control characteristics to different vehicle models and the preferences of individual drivers.

For realizing the objects, there is provided a system for controlling a vehicle automatic transmission. In the system, various operating conditions are determined and a plurality of sets of membership functions of the operating parameters are established in accordance with a plurality of sets of fuzzy production rules. A means is provided to carry out fuzzy reasoning based on the sets of rules to determine a target gear to shift to and an actuator means is provided for driving a gear shift mechanism in response to the determined target gear.

BRIEF DESCRIPTION OF THE DRAWINGS

These and other objects and advantages of the invention will be more apparent from the following description and drawings, in which:

FIG. 5 is a chart for explaining basic rules used by the control system in reasoning for determining the gear ratio;

FIG. 6 is a chart for explaining extra rules used by the control system in reasoning for determining the gear ratio;

FIG. 7 is a chart for explaining rules used with the extra rules in reasoning for determining intention to decelerate;

FIG. 8 is a flowchart showing a subroutine for calculation of the driving resistance used in the extra rules;

FIG. 11 is a chart for explaining parameter numbers and coefficient numbers used in the main routine of FIG. 3;

FIG. 21 is a chart for explaining the relationship between the label numbers and the degree of rule satisfaction;

FIGS. 31 to 36 are diagrams showing data obtained in field tests of the control system according to this invention.

DETAILED DESCRIPTION OF THE PREFERRED EMBODIMENT

Figure 1:
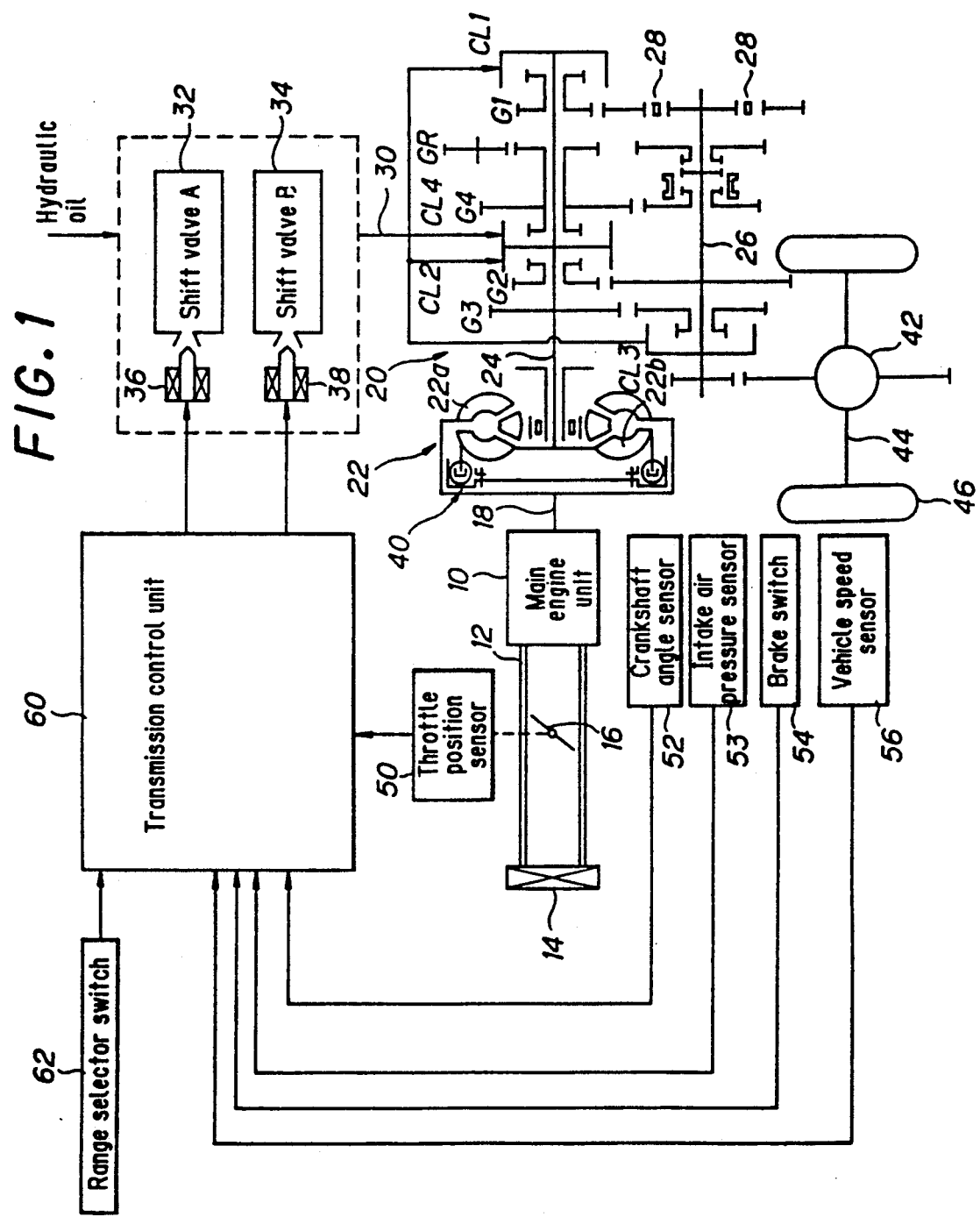
FIG. 1 is a schematic diagram showing the overall arrangement of the vehicle automatic transmission control system according to the present invention.

FIG. 1 is a schematic diagram showing the overall arrangement of the vehicle automatic transmission control system according to the present invention, in which the reference numeral 10 denotes the main unit of an internal combustion engine. The main engine unit 10 is connected with an air intake passage 12 having an air cleaner 14 attached to its far end. The flow rate of the intake air supplied to the main engine unit 10 via the air cleaner 14 and the air intake passage 12 is controlled by a throttle valve 16 linked with and operated by means of an accelerator pedal (not shown) located on the vehicle floor in the vicinity of the driver s seat. A fuel injection valve (not shown) for supplying fuel to the engine is provided at an appropriate portion of the air intake passage 12 in the vicinity of the combustion chamber (not shown). The intake air mixed with the fuel enters the combustion chamber and, after being compressed by a piston (not shown), is ignited by a spark plug (not shown). The fuel-air mixture burns explosively and drives the piston. The driving force of the piston is converted into rotating motion which is made available at an engine output shaft 18.

The stage following the main engine unit 10 is a transmission 20. The output shaft 18 is connected with a torque converter 22 of the transmission 20 and is linked with a pump impeller 22a thereof. A turbine runner 22b of the torque converter 22 is connected with a main shaft 24 (the transmission input shaft). A countershaft 26 (the transmission output shaft) is provided in parallel with the main shaft 24 and between the two shafts there are provided a first speed gear G1, a second speed gear G2, a third speed gear G3, a fourth speed gear G4 and a reverse gear GR, and these gears are provided respectively with multi-plate hydraulic clutches CL1, CL2, CL3 and CL4 (the clutch for the reverse gear is omitted from the drawing in the interest of simplicity). The first speed gear G1 is further provided with hydraulic one-way clutches 28. To these hydraulic clutches is connected a hydraulic line 30 which interconnects a source of hydraulic pressure and a tank (neither shown). A shift valve A 32 and a shift valve B 34 are provided in the hydraulic line 30. The positions of the two switch valves are changed by the energization/deenergization of respective solenoids 36 and 38, whereby the supply/- removal of hydraulic pressure to/from the aforesaid clutches is controlled. The torque converter 22 has a lock-up mechanism 40, whereby the turbine runner 22b and the output shaft 18 can be directly connected in accordance with a command from a control unit to be explained later. Moreover, the countershaft 26 is connected with a rear axle 44 through a differential 42. The rear axle 44 has rear wheels 46 at its opposite ends. The main engine unit 10, transmission 20 and differential 42 are mounted on a chassis (not shown) which, in turn, has a frame mounted thereon, thus constituting the vehicle.

In the vicinity of the throttle valve 16 of the air intake passage 12 there is provided a throttle position sensor 50 such as a potentiometer or the like for detecting the degree of opening of the throttle valve 16. In the vicinity of a rotating member of the main engine unit 10, e.g. near a distributor thereof, there is provided a crankshaft angle sensor 52 such as an electromagnetic pickup or the like. The crankshaft angle sensor 52 detects the position of the piston in terms of the crankshaft angle and produces a signal once every prescribed number of degrees of crankshaft rotation. At an appropriate location downstream of the throttle valve 16 of the air intake passage 12 there is provided an intake air pressure sensor 53 for detecting the absolute pressure of the intake air. In the vicinity of a brake pedal (not shown) provided on the vehicle floor in the vicinity of the driver's seat there is provided a brake switch 54 for detecting depression of the brake pedal. At an appropriate location near the transmission 20 there is further provided a vehicle speed sensor 56 such as a reed switch or the like for detecting the running road speed of the vehicle. The outputs of the sensors 50, 52, 53, 54 and 56 are sent to a transmission control unit 60. The transmission control unit 60 also receives the output from a range selector switch 62 for detecting the selected position of a range selector.

Figure 2:
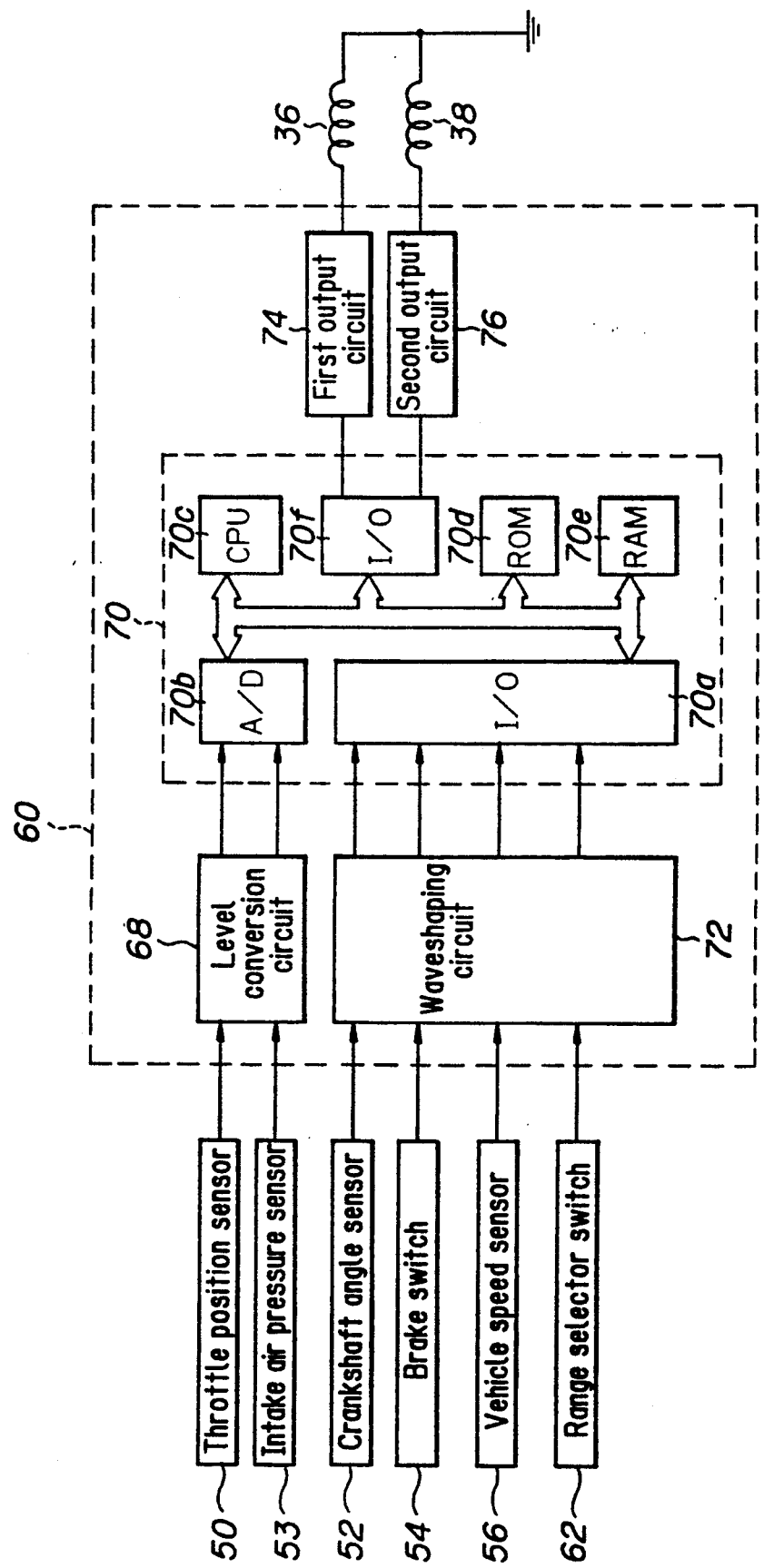
FIG. 2 is a block diagram of a control unit of the control system.

FIG. 2 is a block diagram showing the transmission control unit 60 in detail. As shown in this figure, the outputs from the throttle sensor 50 and intake air pressure sensor 53 input to the transmission control unit 60 are first sent to a level conversion circuit 68 where they are amplified to an appropriate level and the amplified signals are forwarded to a microcomputer 70. The microcomputer 70 has an input port 70a, an A/D converter 70b, a CPU 70c, a ROM 70d, a RAM 70e, an output port 70f, a group of registers (not shown) and counters (not shown). The output from the level conversion circuit 68 is input to the A/D converter 70b whereby it is converted into a digital value, and the digital value is temporarily stored in the RAM 70e.

The outputs from the crankshaft angle sensor 52, break switch 54, vehicle speed sensor 56 and range selector 62 input to the transmission control unit 60 are first waveshaped in a waveshaping circuit 72 and then input to the microcomputer through the input port 70a to be temporarily stored in the RAM 70e. On the basis of these raw measured values and various other calculated values derived therefrom, the CPU 70c determines a gear shift command value, as will be explained later. The determined gear shift command value is sent through the output port 70f to a first output circuit 74 and/or a second output circuit 76 which energize/deenergize the solenoids 36 and 38 accordingly so as to shift the transmission 20 or to hold it in the present gear. This shifting of gears can be conducted, for example, such that the fourth gear is engaged when both of the solenoids are deenergized (off). The operation of solenoids to shift a transmission is, however, well known and not being a feature of the present invention, will not be explained here.

The operation of the control system will now be explained with respect to the flowcharts of FIG. 3 and later figures.

Before going into a detailed description, however, the general features of the control system will first be explained. The control according to this invention is conducted in accordance with rules compiled on the basis of an analysis of the decisions made by human drivers into three categories: (1) absolute decisions of the type "such and such must never be done" which derive primarily from restrictions inherent to the vehicle mechanics, (2) general decisions of the type people make as a matter of course, and (3) decisions for adapting to circumstances of the type "If the circumstances are such and such, then such and such should be done." More specifically, the control know-how of the driver of a vehicle with a manual transmission can be summarized as follows:

1. The driver uses higher gears as the vehicle speed increases and conversely uses lower gears as the vehicle speed decreases.

2. When the driver keeps the accelerator pedal depressed, he delays the time for shifting up (when the accelerator is fully depressed, he delays the time for shifting up by the maximum amount for obtaining maximum vehicle speed).

3. During hill-climbing, he uses a lower gear so that the reserve force will not become insufficient.

4. During hill-descent, he uses a lower gear so as to make use of the engine braking effect.

5. When he intends to decelerate, he does not shift up even when he has released the accelerator pedal.

6. When he intends to decelerate, for making use of the engine braking effect, he uses a lower gear if the present gear is too high.

Since 1 and 2 apply at all times irrespective of the driving conditions, they can be called basic rules. In contrast, 3-6 apply only under specific driving conditions and can be called auxiliary rules.

Figure 4:
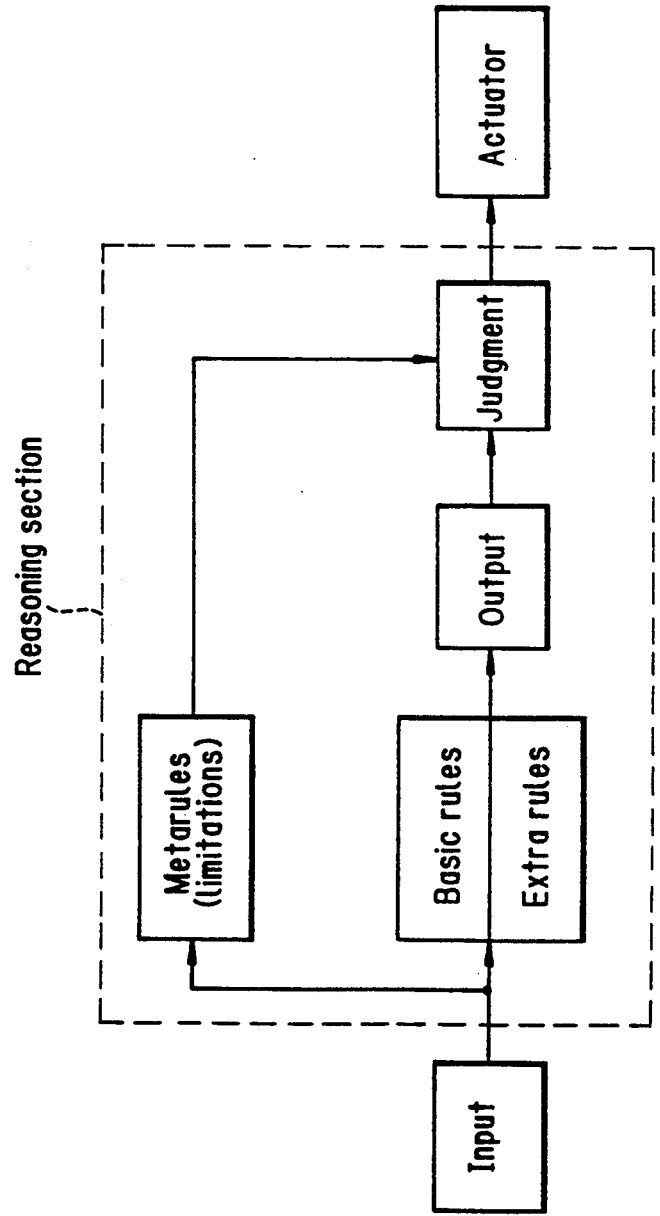
FIG. 4 is an explanatory diagram showing the general features of the control system.

In the light of the aforesaid analysis and results, the control rules used in the control system according to this invention are, as shown in FIG. 4, divided into three categories: basic rules (the first category of rules mentioned above), extra rules (the second category) and metarules (the third category). The basic rules fall within the scope of general decisions and are centered on the foregoing rules 1 and 2. The extra rules relate to decisions for adapting to circumstances and are centered on the foregoing rules 3-6. The metarules reflect absolute decisions. As shown in FIG. 4, in the control according to this invention data required for the control is obtained from the input block, fuzzy reasoning for determining a control value is conducted in the reasoning section based on the basic rules and the extra rules, and the determined control value is forwarded to the judgment block through an output block. In parallel, the input data is checked with reference to the metarules defining physical (mechanical) limitations and the result is forwarded to the judgment block where it is used to adjust the control value. The adjusted control value is then output to an actuator.

The basic rules and extra rules are shown in FIGS. 5 and 6 expressed in terms of a first and second set of fuzzy production rules. FIG. 5 shows the six basic rules expressed in the form of "If . . . , then . . . ". The basic rules apply throughout the whole range of driving circumstances and have as their parameters the vehicle speed V (0-250 km/hr), the current gear position $S_O$ and the degree of throttle opening $\theta TH$ [0° (fully closed)−84° (fully open)]. In addition, each rule has a respective gear shifting conclusion. The meaning of these rules is as stated in the figure.

FIG. 6 shows the five extra rules including their parameters and gear shifting conclusions. The parameters used for these rules are the driving resistance R/L, throttle opening $\theta TH$, the vehicle speed V, the current gear position $S_O$ and the intention to decelerate. Other intentional conditions (to be explained later) may be used as parameters in addition to or in place of the intention to decelerate. These predetermined fuzzy production rules are drafted at the time the vehicle is designed. During actual driving, the parameters are detected/calculated, and these rules are used for determining a control value through fuzzy reasoning.

Figure 3:
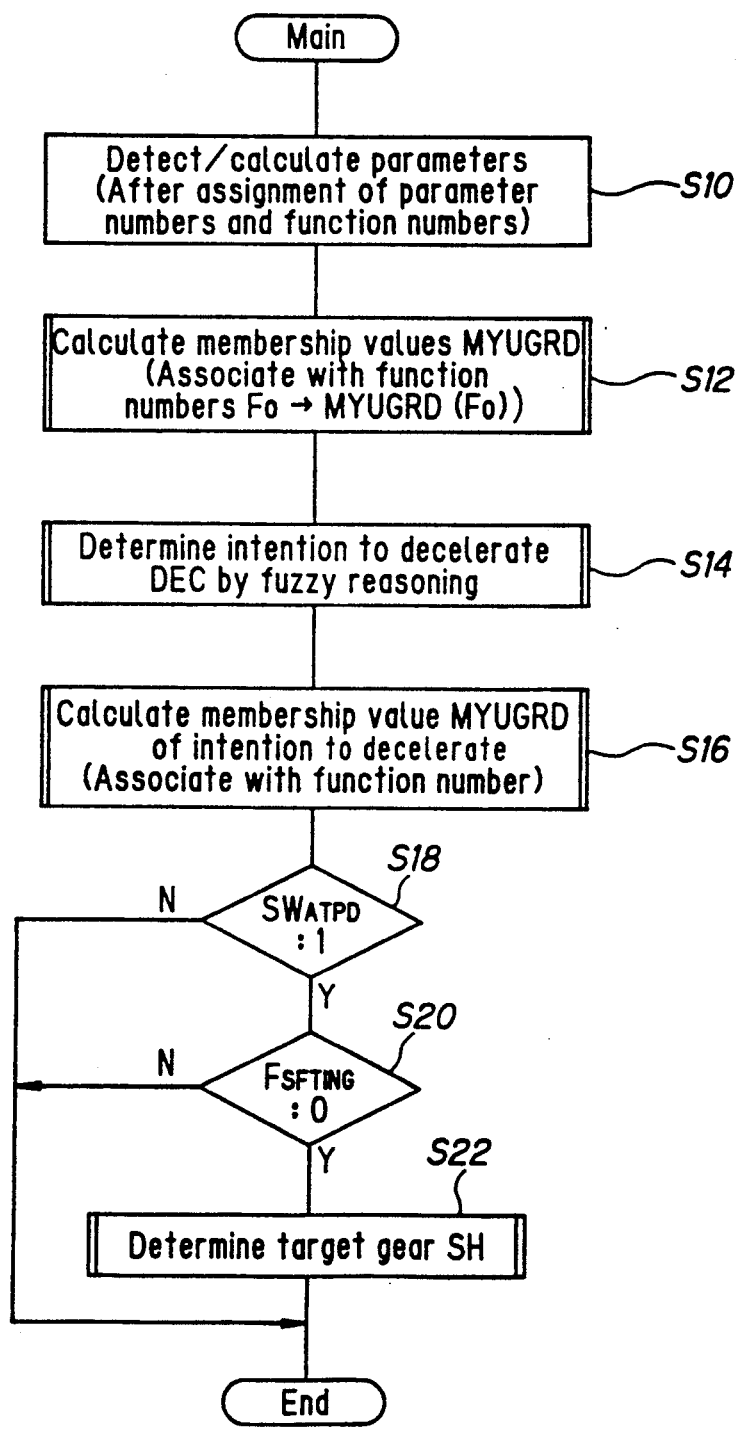
FIG. 3 is a main routine flowchart showing the operation of the control system.

FIG. 3 is a flowchart showing the main routine for the control value determination. In the first step S10 of this routine, the parameters just mentioned are read or calculated, as the case may be.

An explanation will now be made with respect to the calculation of the driving resistance and other parameters used in the rules. The subroutine for this purpose is shown by the flowchart of FIG. 8. First, in step S100 of the flowchart of FIG. 8, the current torque TE is calculated as Current torque TE=(716.2×Actual horsepower)/(Engine speed) (kg.m)

The actual horsepower is obtained, for example, by retrieval from a map stored in ROM using the engine speed and the intake air pressure as address data. In the equation, 716.2 is the constant conventionally used for converting horsepower to torque.

Figure 9:
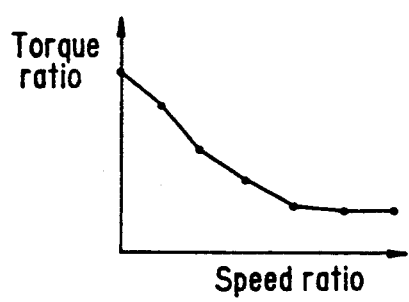
FIG. 9 is a graph for explaining the torque ratio characteristics used in calculating the driving resistance.
Figure 10:
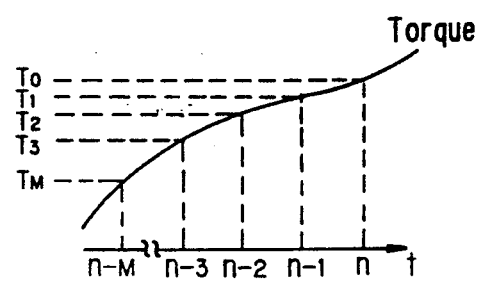
FIG. 10 is a graph for explaining the calculation of the mean torque used in calculating the driving resistance.

The procedure then moves to step S102 in which the torque increase TR by torque converter 22 is retrieved from the map shown in FIG. 9, step S104 in which current torque TE is multiplied by the torque increase TR to obtain the adjusted torque TO, and then to step S106 where the mean value TRQ of the adjusted torque is calculated. The adjustment here is made in view of the fact that there is some delay between the time of a change in the degree of throttle opening and the time that the change is reflected in engine output. FIG. 10 shows the manner in which the mean value is calculated.

After confirming that braking is not being conducted in step S108, the procedure advances to step S110 in which the driving resistance R/L is calculated as follows:

Driving resistance R/L=[(Average torque TRQ×Transmission efficiency $\eta$×Overall gear ratio G/R)/Effective tire radius r)−(1+Equivalent mass coefficient)]×(Vehicle weight M×Acceleration $a$)] [kg]

The transmission efficiency $\eta$, overall gear ratio G/R, the effective tire radius r, and vehicle weight M (ideal value) are obtained and stored in ROM in advance.

The reason for calculating the driving resistance in the foregoing manner will now be explained.

The vehicle dynamics can be obtained from the law of motion as $$\textit{Motive force F} - \textit{Driving resistance R} = \textit{Vehicle weight} \\ M \times \textit{Acceleration a [kg]} \qquad (1)$$

wherein F=(Torque (mean) TRQ×Overall gear ratio G/R×Transmission efficiency $\eta$)/(Effective tire radius r) [kg].

$$R = (\textit{Rolling resistance } \mu 0 + \textit{Grade} \sin \Theta) \times \textit{Vehicle} \\ \textit{weight } Wr + \textit{Aerodynamic drag } (\mu A \times V^2) \, [kg]$$

The variables in the foregoing equations are the vehicle weight Wr, which varies with the number of passengers and the amount of the cargo, and the grade sin $\Theta$, which differs depending on the inclination of the road surface, and all of these factors are included in the driving resistance. Therefore, by rewriting the aforesaid equation (1), there is obtained $$\textit{Driving resistance R} = (\textit{Motive force F}) - (\textit{Vehicle} \\ \textit{weight (ideal) } M \times \textit{Acceleration a}) \, [kg]$$

If it is found in step S108 that braking is being conducted, since the braking force makes it difficult to calculate the driving resistance with accuracy, the procedure advances to step S112 in which the value calculated in the preceding cycle is used.

The intention to decelerate used in extra rules 10 and 11 in FIG. 6 is not a physical quantity but is determined through another fuzzy reasoning process in accordance with rules 12 and 13 of FIG. 7. This will be explained later. The calculation of the gear position will also be taken up later.

The aforesaid parameters (other than the intention to decelerate) are measured or calculated in step S10 of the flowchart of FIG. 3. For carrying out this processing appropriately, the parameters are assigned parameter numbers (1-19) in advance as shown in FIG. 11, and are thereafter identified by their assigned parameter numbers. For example, the vehicle speed is identified as parameter number 1, the degree of throttle opening is identified as parameter number 2 and so forth with the remaining parameters. Although not necessarily required in the present embodiment, FIG. 11 shows reserved space for up to nineteen different parameters. Further, the membership functions for each parameter are assigned four function numbers (1-76) in order to simplify the processing. For example, the vehicle speed, which is used in rules 1-6 and 7-9, uses one of three types of membership functions including the fuzzy set rising to the right shown for rule 1, the fuzzy set falling to the right shown for rule 2 and the fuzzy set of trapezoidal shape of rule 7. Thus, these three types of membership functions are specified by function numbers 1-3. It should be noted that function number 4 has no content. Similarly, the membership functions used in the rules for the degree of throttle opening are consecutively assigned the next four function numbers 5-8 and so on with the remaining parameters.

The procedure then advances to step S12 in which the parameters are used for calculating the membership value MYUGRD and associating the membership value with a function number (indicated as F0) with the result thereafter indicated as MYUGRD (F0). By way of example, this will be generally explained with reference to FIG. 11 for the case of the vehicle speed. The membership value (grade) for the detected vehicle speed is read from the pertinent membership functions, and with respect to membership function number 1, for example, is found to be 0.3.

Figure 12:
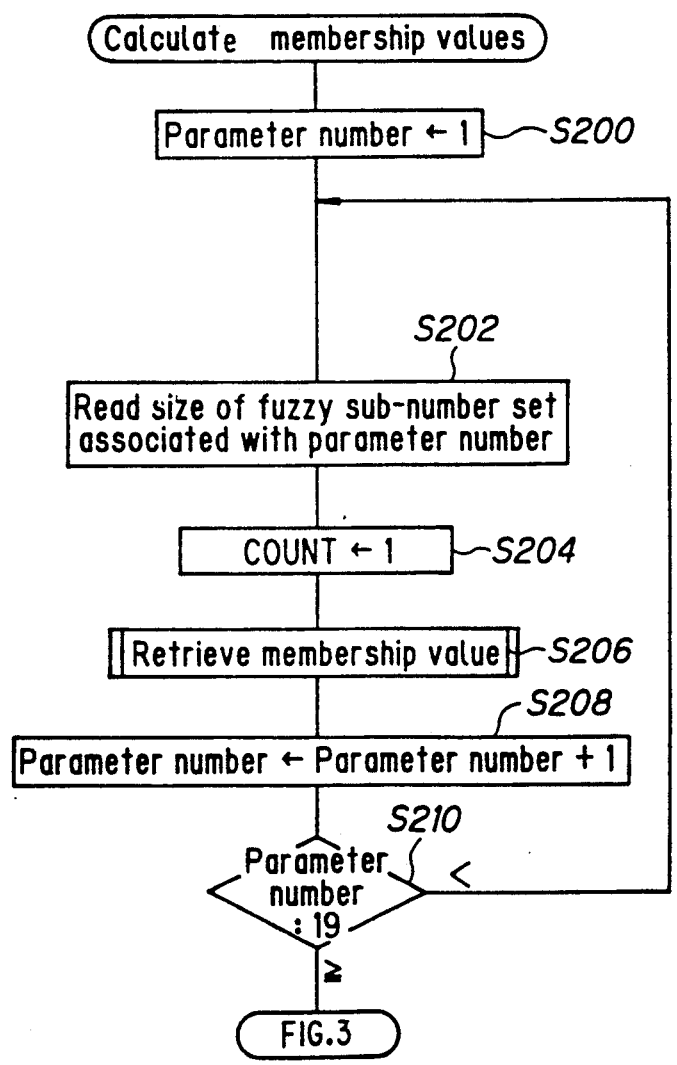
FIG. 12 is a flowchart showing a subroutine for calculation of membership values in the main routine of FIG. 3.

FIG. 12 is a flowchart showing a subroutine for calculating the membership values. The subroutine starts with step S200 in which initialization is conducted for setting the parameter number to 1 (vehicle speed). The procedure then moves to step S202 for reading out the size of the fuzzy sub-number set associated with this parameter number, namely, the number of different membership functions in which the parameter is used (three in the case of the vehicle speed). Then in the following step S204 the count value of a counter COUNT for counting the fuzzy sub-numbers is set at 1, whereafter the membership grade (value) is retrieved in step S206.

Figure 13:
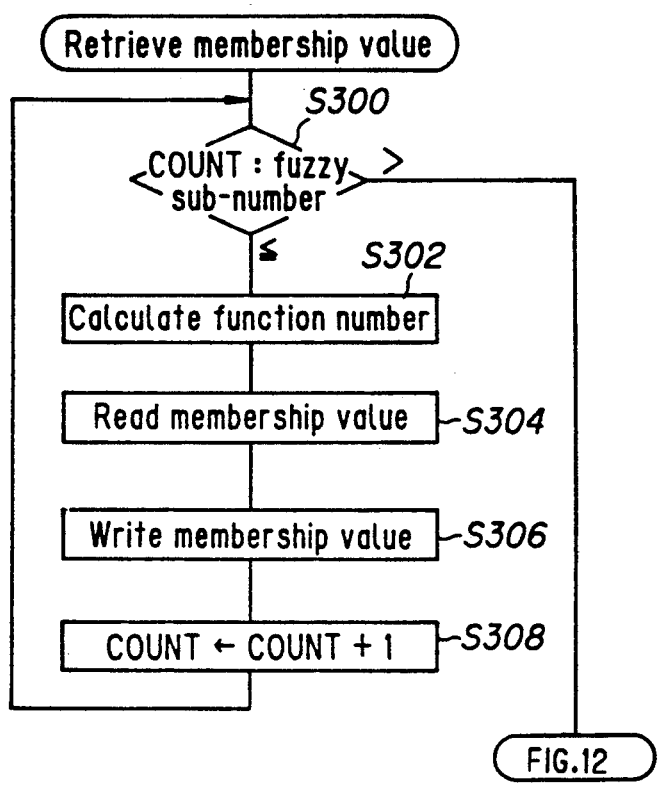
FIG. 13 is a flowchart showing a subroutine for membership value retrieval in the subroutine of FIG. 12.

The flowchart of FIG. 13 indicates the routine for this retrieval. First, in step 300, the count value is compared with the fuzzy sub-number. In the first cycle, the count value is naturally found to be smaller than the sub-number so that the procedure advances to step S302 in which the function number is calculated as (4×(Parameter number −1)+COUNT), to step S304 in which the membership value is read, to step S306 in which the read value is written to an appropriate address in RAM, and finally to step S308 in which the value of COUNT is incremented. This process is repeated until it is found in step S300 that the value of COUNT has exceeded the fuzzy sub-number, and when this happens the procedure returns to the subroutine of FIG. 12 where, in step S208, the parameter number is incremented and the same process is repeated. When it is found in step S210 that the parameter number has become 19 or larger, the subroutine is concluded. (Numbers 1-18 are used for the parameters other than the intention to decelerate, which is assigned the number 19.)

The procedure then reverts to the main routine shown in FIG. 3, advancing to step S14 in which the intention to decelerate is determined by fuzzy reasoning.

Figure 14:
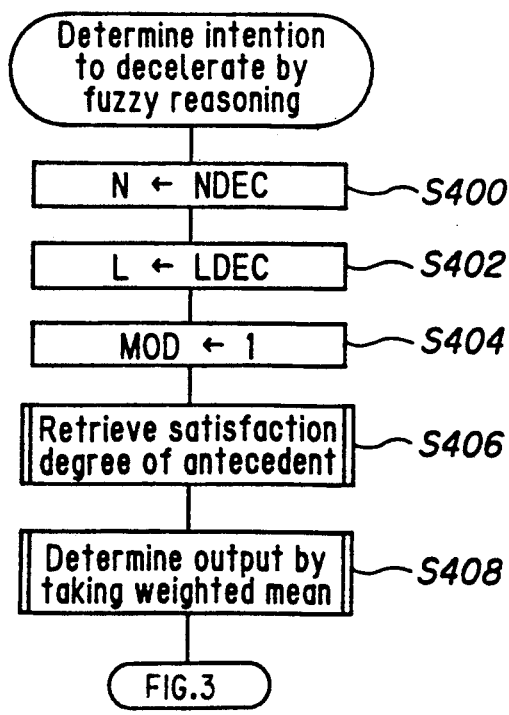
FIG. 14 is a flowchart showing a subroutine for reasoning to determine intention to decelerate in the main routine of FIG. 3.

The subroutine for this reasoning is shown in FIG. 14. Before going into an explanation of this subroutine, however, an explanation of a third set of fuzzy production rules used in the reasoning for determining the intention to decelerate will be explained with reference to FIG. 7.

Two fuzzy production rules having intention to decelerate conclusions, rules 12 and 13, are used in the reasoning for determination of intention to decelerate. As mentioned earlier, the intention to decelerate is not determined as a physical value but as a value obtained through fuzzy reasoning. There is a good reason for this. While all of the other extra rules relate to special, limited driving circumstances (hill-climbing, hill-descent and deceleration), the intention to decelerate is different in that it does not relate to the driving environment as do hill-climbing and other limited driving circumstances but relates to an intended driving condition that arises from the driver's own desire to decelerate. Rather than perceiving it in terms of a physical quantity, therefore, from the point of realizing control matched to human feelings it is better to determine it on the basis of appropriate physical quantities through reasoning aimed at determining the intention of the driver. Although this approach is used only with respect to the intention to decelerate in this embodiment, it is also possible to ascertain the driver's intention to accelerate or his intention to save fuel through similar reasoning. Thus in addition to using the "intention to decelerate" parameter other parameters with respective conclusions may be used such as "intention to accelerate", "intention to save fuel" and so forth. For the purpose of this application, these types of parameters are referred to as "intentional conditions."

Figure 15:
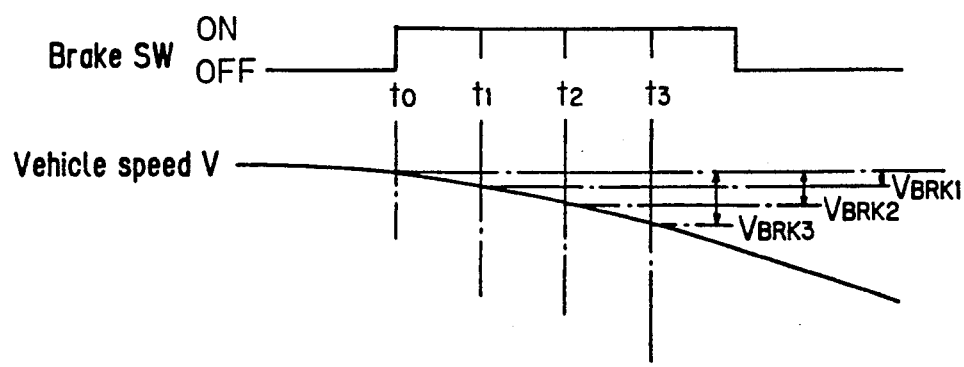
FIG. 15 is a graph for explaining the detection of the vehicle speed during braking used for reasoning to determine intention to decelerate in the main routine of FIG. 3.

The physical quantities selected to use in determining the intention to decelerate through reasoning are the degree of throttle opening $\theta TH$, the acceleration $\alpha$ and the vehicle speed during braking VBRK. The acceleration $\alpha$ is defined as the difference in vehicle speed per prescribed period of time, while, as shown in FIG. 15, the vehicle speed during braking VBRK is defined as the decrease in vehicle speed from that at the time t0 when the brake pedal was depressed. The driver's "intention" is known only to himself and can only be inferred through changes in his driving pattern observed through his operation of the accelerator pedal and other operating members of the vehicle. On the basis of various considerations, it was concluded that the driver has an intention to decelerate in the case where the accelerator pedal is not depressed, the brake pedal is depressed and the acceleration is negative, and that his intention to decelerate can be presumed to be less when he depresses the accelerator pedal. As a result, the rules set out in FIG. 7 were drafted.

Figure 16:
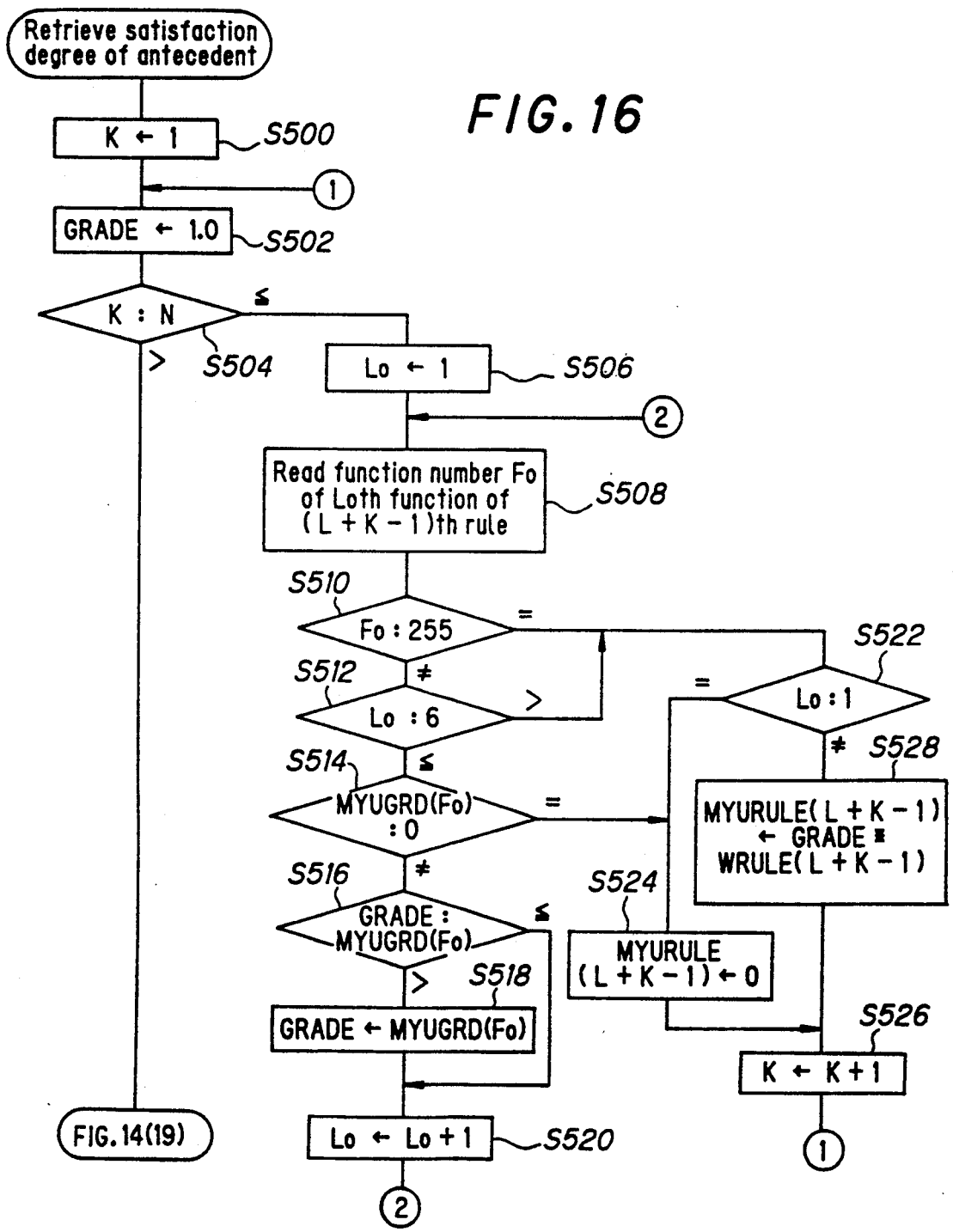
FIG. 16 is a flowchart showing a subroutine for antecedent retrieval in the subroutine of FIG. 14.
Figure 17:
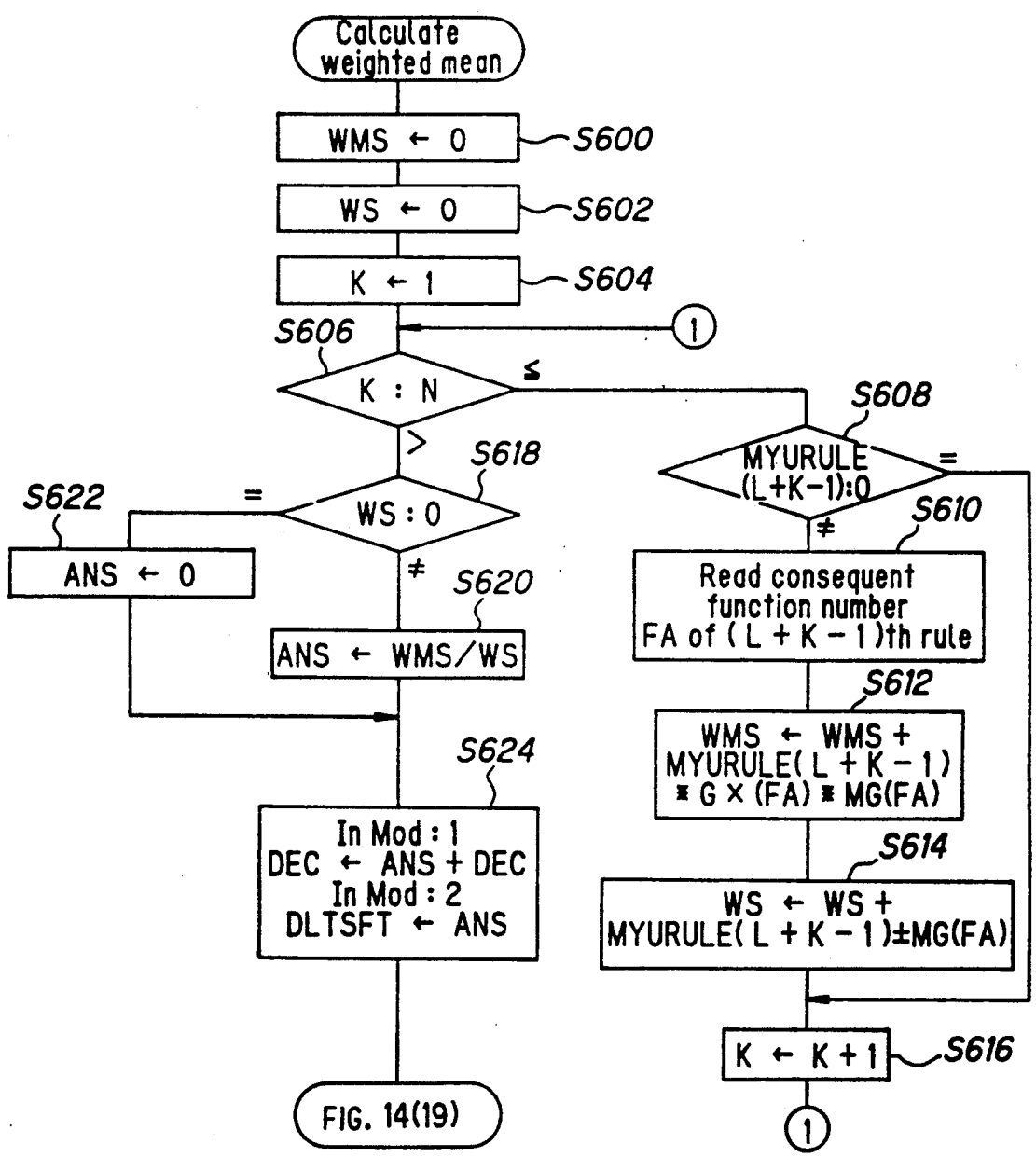
FIG. 17 is a flowchart showing a subroutine for calculation of a weighted mean in the subroutine of FIG. 14.

Based on the foregoing, the fuzzy reasoning for determining intention to decelerate will now be explained with reference to FIG. 14. In step S400, the count value of a counter NDEC is initialized by setting it to the total number of rules required in the reasoning, which in the present embodiment is two. The procedure then advances to step S402 in which the count value of another counter LDEC is initialized by setting it to the rule number of the first rule that is to be retrieved. This rule number is 12 in the first cycle of the routine. The procedure then moves to step S404 in which the processing mode is set to MOD 1 and to step S406 in which the degree of satisfaction of the antecedent is retrieved as illustrated in FIG. 16. This is an operation for calculating the minimum membership value of the IF portion of the "If . . . , then . . . "rule in FIG. 7. In the following step S408, an output decision is made by taking the weighted mean of the conclusions as illustrated in FIG. 17. This is done by synthesizing the waveforms of the conclusions for the respective THEN portions for obtaining a weighted mean of the conclusions, and then determining the final result value. As these tasks are also conducted at the time of determining the gear shift command value, they will be explained in detail in connection with this determination and roughly in connection with the reasoning for determining the intention to decelerate. As shown in FIG. 7, the measured values are applied to the membership functions of rules 12 and 13 for determining the values at the intersection with the waveforms. Where the values obtained in this way for rule 12 are, for example, degree of throttle opening $\theta TH=0.7$, acceleration $\alpha=0.7$ and vehicle speed during braking VBRK=1.0, the smallest value, i.e. 0.7, is taken as the degree of satisfaction of rule 12. The smallest/only value for rule 13 is similarly found to be 0.3, for example. The waveforms of the conclusions for rules 12 and 13 are then summed by waveform synthesis in accordance with the smallest grade value to obtain a weighted mean of, say, 0.025 as the conclusion.

Figure 18:
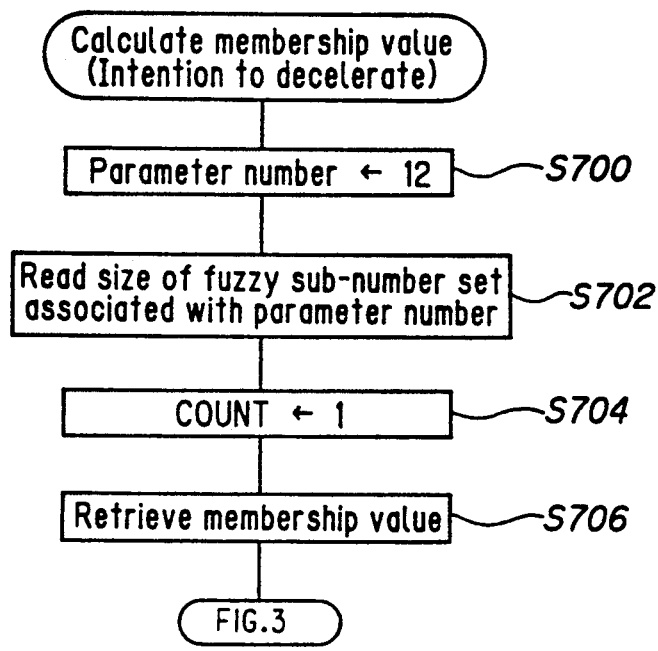
FIG. 18 is a flowchart showing a subroutine for calculation of the membership value of the intention to decelerate in the main routine of FIG. 3.

The intention to decelerate obtained in this way is then used in rules 10 and 11 of FIG. 6, where it serves as the basis for judging the degree of satisfaction of the antecedents of these rules. That is, the membership value of the intention to decelerate is calculated in S16 of FIG. 3. Specifically, in S700–S706 of the subroutine of FIG. 18, retrieval is conducted by the same procedures as explained earlier in conjunction with FIGS. 12 and 13 and the retrieved values are used for judging the degree of satisfaction of rules 10 and 11.

Since all of the parameters have been detected or calculated upon completion of the aforesaid procedures, after it has been confirmed in step S18 of the main routine of FIG. 3 that the range selector switch indicates that SWATPD is 1 (D range) and in step S20 that a flag FSFTING (to be explained later) indicating whether or not shifting is in progress is 1 (i.e. after it is confirmed that shifting is not in progress), the procedure advances to step S22 in which the target gear ratio (gear position) SH is determined. (When the judgment is negative in either of steps S18 or S20, the routine is immediately discontinued.) This main routine is activated at appropriate time intervals.

Figure 19:
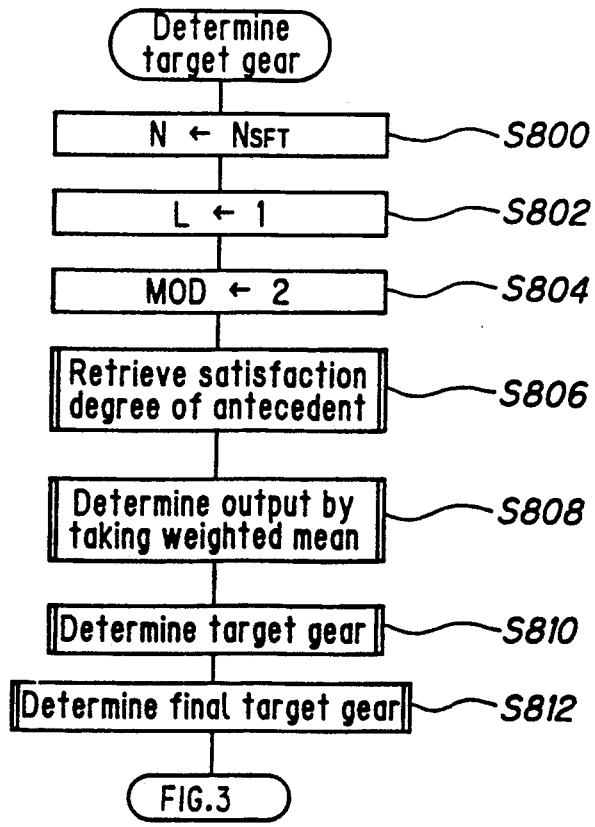
FIG. 19 is a flowchart showing a subroutine for determination of the target gear in the main routine of FIG. 3.

FIG. 19 shows the subroutine for determining the target gear. In the first step S800 the count value of a counter NSFT is initialized by setting it to the number of rules required for the reasoning N (11 in this embodiment). In the following step S802, the count value of a counter L is initialized by setting it to the number of the first rule (=1) among the rules required for determining the target gear. Then in step S804 the processing mode is set to the shift processing mode (MOD 2).

The procedure then advances to step S806 in which the degree of satisfaction of the antecedent is retrieved. Referring to FIG. 16 mentioned in passing earlier, in step S500 the count value of a counter K is set to 1 if this is the first activation of this subroutine. Then in step S502 the value of GRADE indicating the minimum degree of satisfaction of the rule up to the present is initialized by setting it to an appropriate value such as 1.0. In the following step S504, the number of rules retrieved so far K is compared with the number of rules required for the reasoning N.

Figure 20:
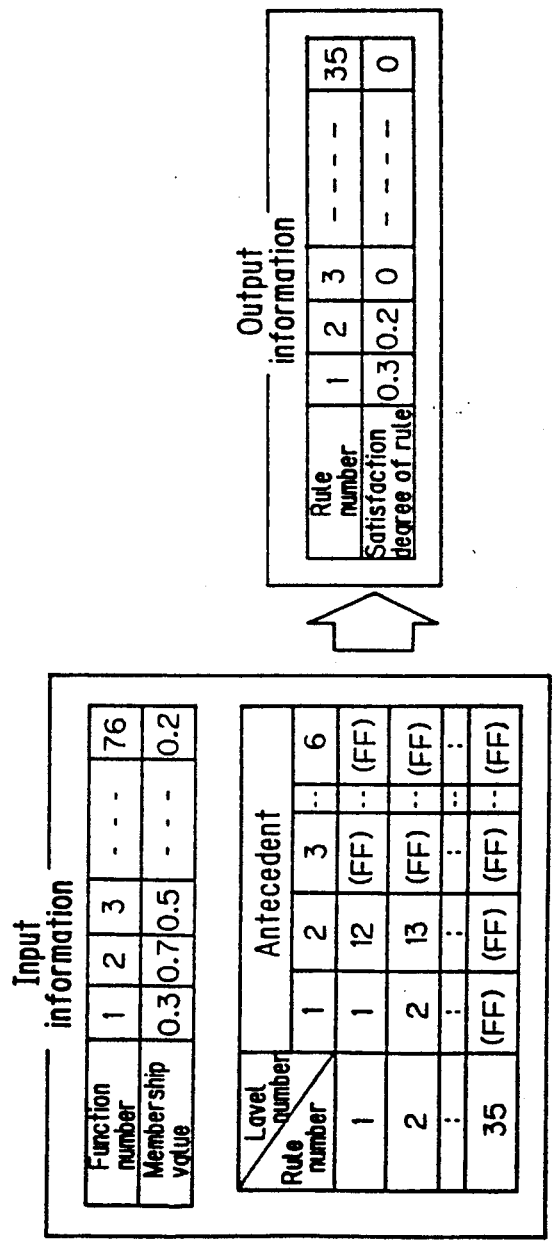
FIG. 20 is a diagram showing the label numbers, rule numbers and other information used in the antecedent retrieval.

The first time this subroutine is activated, the relationship will of course be K<N so that the procedure advances to step S506 in which the count value of a rule antecedent label number counter L0 is initialized by setting it to 1. In the following step S508, the function number F0 of the (L+K−1)th rule is read. This will be better understood from FIGS. 20 and 21. As shown in FIG. 20, the membership values corresponding to the function numbers have already been read while the parameters used in the respective rules are progressively numbered (with the aforesaid label numbers). Taking rule 1 as an example, since the parameters used are the vehicle speed and the gear position, the vehicle speed is assigned label number 1 and the gear position is assigned the label number 2. Since rule 1 uses only two parameters, label number 3 and higher label numbers (up to a maximum of 6) are assigned an appropriate value FF which can be 255, for example. In this way it is possible to associate the parameters of the respective rules with their membership values. Therefore, at the time of first activating the subroutine, the membership value (MYUGRD (F0)) of the function number (=1) of label number 1 of the first (=L+K−1) rule is read in step S508.

Next, in step S510, the value of the function number is compared with a prescribed value, e.g. 255. As the result is of course negative, the procedure goes to step S512 in which the label number is compared with the maximum number (6). As this is a fail-safe type confirmation operation, the result is of course negative and the procedure advances to step S514 where it is judged whether or not the value read in step S508 is equal to zero. If it is found not to be zero, the procedure moves to step S516 in which it is compared with the value of GRADE (initial value 1), and if it is found to be smaller than the GRADE value, the value of GRADE is replaced with the value of MYUGRD (F0) in step S518 and this value is taken as the minimum degree of satisfaction up to this point. The label number is then incremented in the following step S520, whereafter the same procedures are repeated with respect to the next parameter (the gear position in the case of rule 1).

Figure 21:
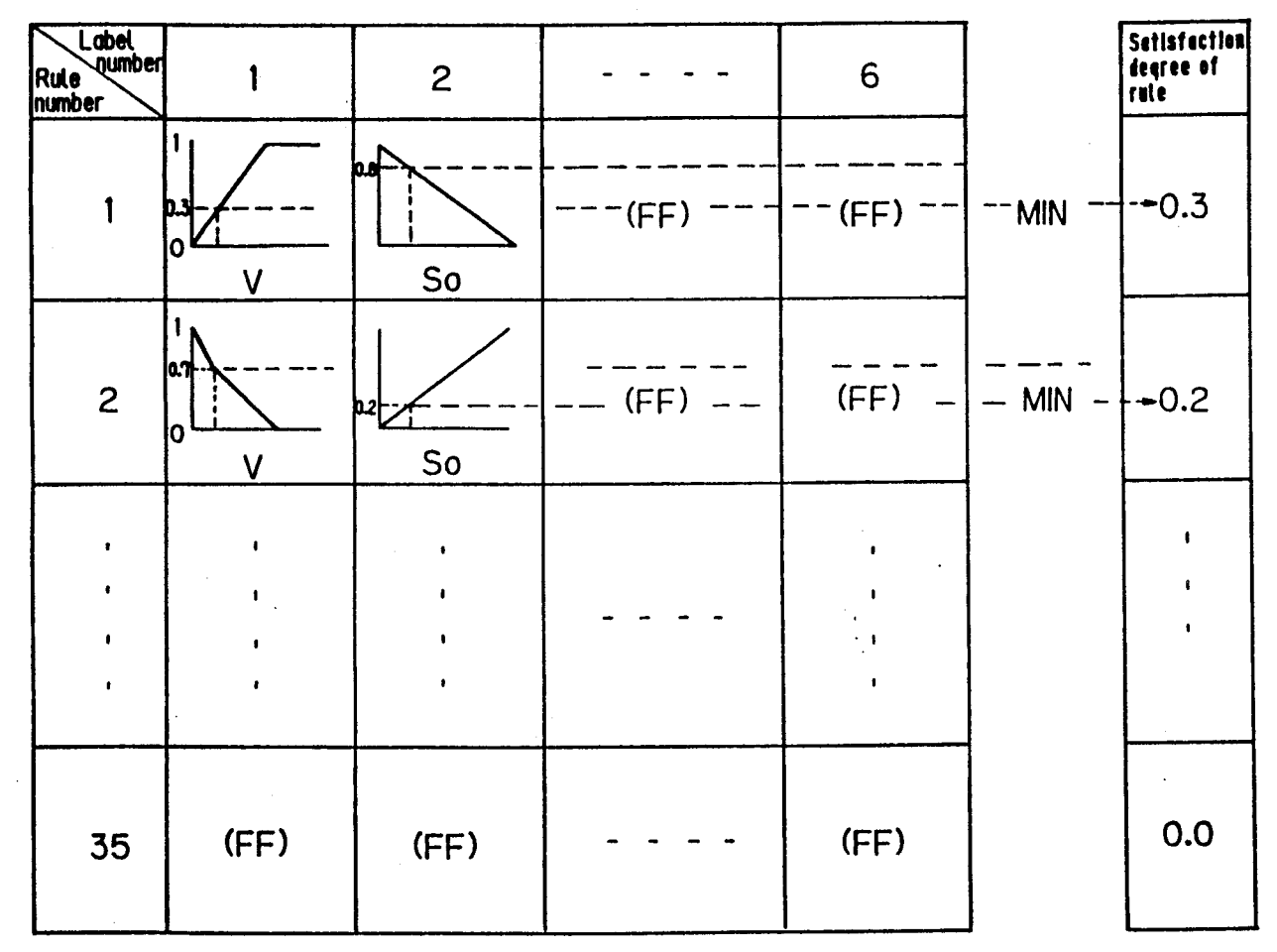

In other words, as shown in FIG. 21, through these operations the membership values of the parameters for the respective rules are progressively retrieved and the minimum value for each rule is selected. In the case where the rule has no corresponding parameter, the membership value for the label number is assigned an appropriate value FF, e.g. 255, so that it is judged in step S510 that F0=FF and the procedure advances to step S522 where it is judged whether or not the label number is 1. If the label number is 1, which means that no rule exists, the procedure advances to step S524 where the degree of satisfaction MYURULE (L+K−1) for the rule is made zero and the next rule is taken up in step S526.

Otherwise the procedure goes to step S528 where the GRADE value is defined as the degree of satisfaction of the rule and then to step S526 in which the rule number counter is incremented. In this way the degrees of satisfaction (minimum values) of the respective rules are progressively determined. When MYUGRD (F0) is judged to be zero in step S514, there is no need to retrieve the membership value for the other parameters since the minimum value for the rule will naturally be zero irrespective of what the other membership values may be. In the interest of simplicity in the processing, therefore, step S524 is skipped in such cases.

Returning to FIG. 19, the procedure advances to step S808 in which the output value is determined by taking the weighted mean.

The procedure for this is shown in FIG. 17. First, in steps S600 and S602, the values of WMS and WS stored in RAM are initialized by setting them to zero. (These values will be explained later.) The procedure then moves to step S604 in which the count value of the rule number counter K is set to a value 1 (rule 1) and then to step S606 in which this set value is compared with the count value of the counter N indicating the total number of rules required for the reasoning. The first time this subroutine is activated, the relationship will of course be found to be K<N so that the procedure advances to step S608 in which it is judged whether or not the degree of satisfaction of rule 1 retrieved earlier is zero.

Figure 22:
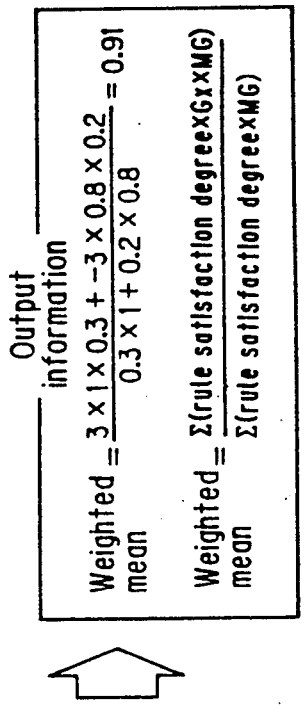
FIG. 22 is a diagram for explaining the calculation of the weighted mean.

When it is found in step S608 that the retrieved value is not zero, the procedure goes to step S610 in which the consequent function number FA of the (L+K−1)th rule is read. In the case of rule 1, for example, the membership function has a waveform which, in line with the statement ". . . then shift the gear position up greatly," peaks at a conclusion of +3 gear positions. While an algebraic approach in which the relationship is expressed directly as consequent = +3 can be used, in this embodiment the gear shifting conclusions are separated into categories in advance by assignment of consequent function numbers as shown in FIG. 22. For example, the conclusion of +3 gear positions associated with rule numbers 1 and 3 is assigned consequent function number 1, the conclusion of −3 gear positions associated with rule number 2 is assigned consequent function number 3 and so forth. It should be noted that although the consequent function numbers (formerly expressed as "FA" in FIG. 17) are expressed generally as "n" in FIG. 22, they are quite the same.

The procedure then moves to step S612 in which the value of WMS to be stored in RAM is calculated and then to step S614 in which the rule number counter is incremented. This will be explained with reference to FIG. 22. Assume, for example, that the degree of satisfaction of the selected antecedent is 0.3 in the case of rule 1 and is 0.2 in the case of rule 2. Then the consequent of rule 1 becomes +3 and the consequent of rule 2 becomes −3. Further, if the weight of the consequents is made 1.0 in the case of rule 1 and 0.8 in the case of rule 2, then, as shown in the figure, the weighted mean becomes Weighted mean = [Summation of each rule's degree of satisfaction MYURULE (L+K−1)×Center of gravity position $G_X$(FA) corresponding to consequent function number ×Weight MG (FA) at center of gravity corresponding to the consequent function number]/[Summation of each rule's degree of satisfaction MYURULE (L+K−1)×Weight MG (FA) at center of gravity corresponding to consequent function number]

Thus, the consequents of each rule, i.e. the gravity position and the weight, are weighted by the satisfaction degrees of the rule antecedents to find a mean value The weight can be predetermined in any ways. For example, it can be predetermined in terms of the importance associated with the rules.

Figure 23:
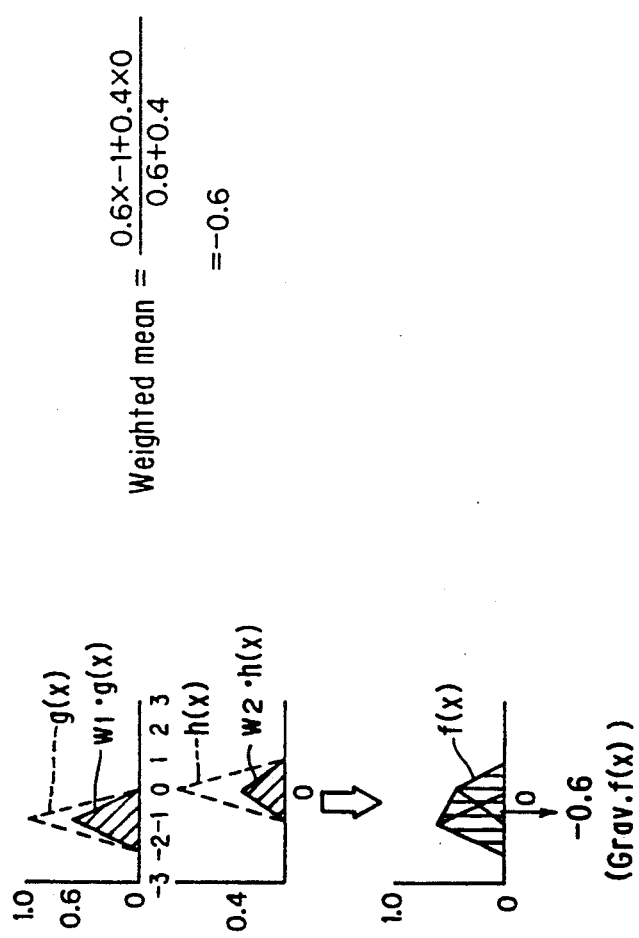
FIG. 23 is a diagram for explaining a specific example for calculating the weighted mean.

As shown in FIG. 23, a simplified method for determining the weighted mean is used in this embodiment. Specifically, at the time of calculating the value of the consequent from the degrees of rule satisfaction, instead of using the commonly employed method in which the triangular configurations are truncated at the positions of the degrees of satisfaction, triangular configurations (indicated by hatching) are formed having apices at these positions (at 0.6 and 0.4 in the illustrated example) and the resulting triangles are also summed at the time of being transferred to a common universe of discourse.

Namely, when defining in FIG. 23 as:

$$f(x) = w1g(x) + w2h(x)$$

The gravity of the graph f(x) can be defined as:

$$\{\int xf(x)dx\}/\{\int f(x)dx\}$$

$$\begin{aligned}\text{Denominator} &= \int f(x)dx = w1\int g(x)dx + w2\int h(x)dx \\ &= w1Sg(x) + w2Sh(x)\end{aligned}$$

(The integrated value is replaced with area S.)

$$\begin{aligned}\text{Numerator} &= \int xf(x)dx = \int xw1g(x)dx + \int xw2h(x)dx \\ &= w1\int xg(x)dx + w2\int xh(x)dx\end{aligned}$$

The gravity of g(x) will be similarly found as:

$$\{\int xg(x)dx\}/\{\int g(x)dx\} = Grav.g(x)$$

Therefore, the numerator will be rewritten as:

$$Numerator = w1 \cdot Grav.g(x) \cdot Sg(x) + w2 \cdot Grav.h(x) \cdot Sh(x)$$

Thus, the output of the f(x) graph will be:

$$Grav.f(x) = \{w1 \cdot Grav.g(x) \cdot Sg(x) + w2 \cdot Grav.h(x) \cdot Sh(x)\}/\{w1 \cdot Sg(x) + w2 \cdot Sh(x)\}$$

The calculation is facilitated. As shown in FIG. 23, it is possible to realize a further simplification by using a fixed weighting.

In FIG. 17, WMS in step S612 corresponds to the numerator of the above equation while WS in step S614 corresponds to the denominator thereof. By repeatedly executing the steps S606–S616 in a loopwise manner while adding the value obtained during each loop to the total for the preceding loops, it is possible to obtain separate sums for the numerators and the denominators with respect to rules 1–11.

When it is found in step S606 that the rule number has come to exceed the number of rules to be retrieved, the procedure moves to step S618 in which judgment is made as to whether or not WS is zero and if the result is negative, WMS is divided by WS in step S620. If WS is found to be zero in step S618, the quotient ANS is set to zero in S622.

The procedure then advances to step S624 in which the quotient ANS is defined as the target value DLTSFT (difference between present gear and the target gear). With regard to the intention to decelerate DEC (MOD 1) mentioned earlier, the value of DEC in the preceding cycle is added to the value of ANS in the current cycle. This is because the driver can be expected to maintain his intention for a relatively long period so that it is more appropriate to add the value of DEC without updating it.

Returning to FIG. 19, the procedure now advances to step S810 in which the target gear is determined.

Figure 24:
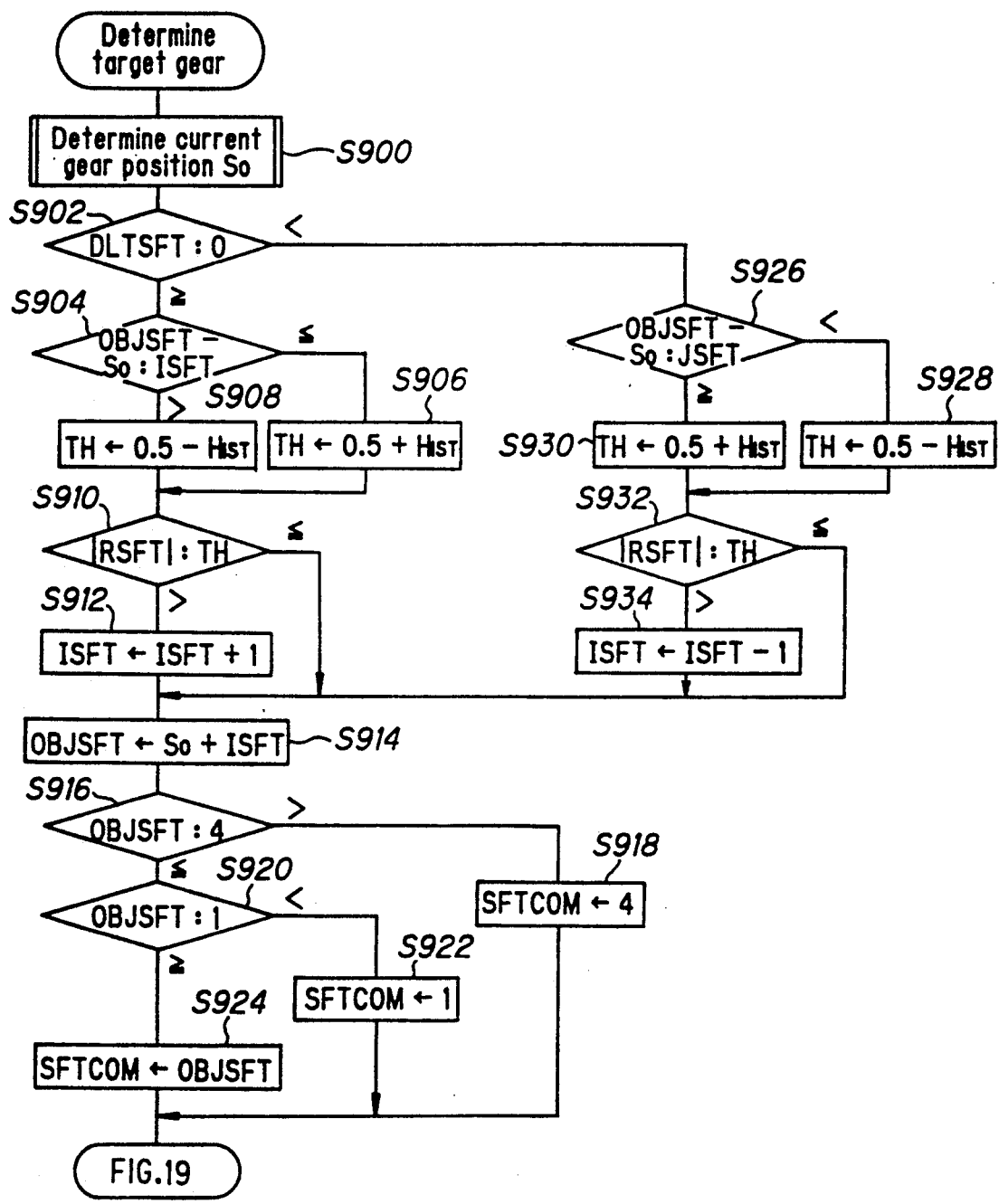
FIG. 24 is a flowchart showing a subroutine for the determination of the target gear in the subroutine of FIG. 19.

FIG. 24 shows a subroutine for output determination. In the first step S900, the current gear position is determined. This determination is made through a logical process, not by provision of a gear position switch.

Figure 25:
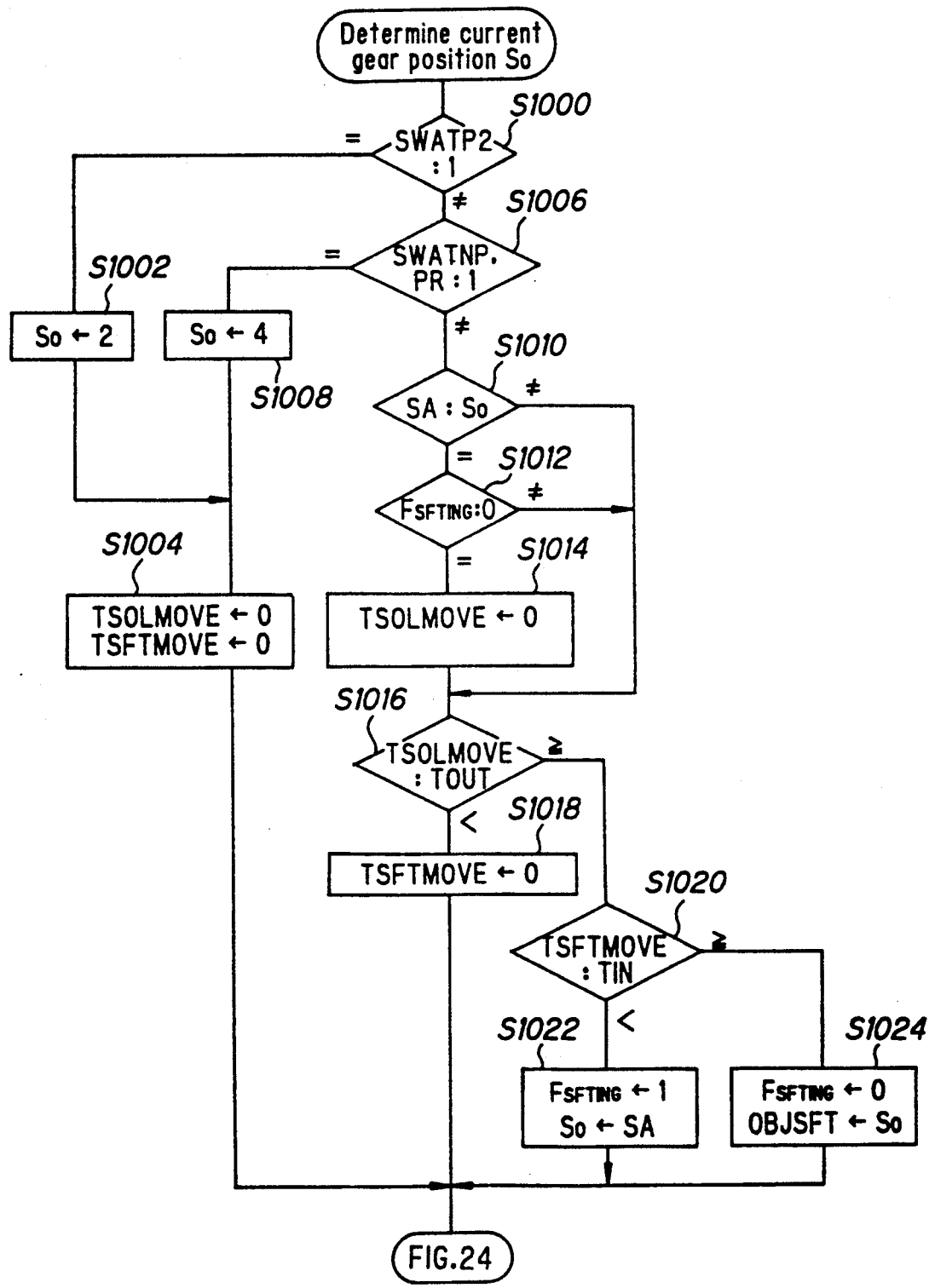
FIG. 25 is a flowchart of a subroutine for determination of the current gear in the subroutine of FIG. 24.

The subroutine for this purpose is shown in FIG. 25. In the first step S1000, it is judged whether or not the range selector switch indicates that SWATP2 is 1 (that the range selector is in second gear) and if the result is affirmative, the procedure advances to step S1002 in which the current gear is determined to be second gear, and then to step S1004 in which timers SOLMOVE and TSFTMOVE are reset and the execution of the subroutine is discontinued. If the result is negative, the procedure goes to step S1006 in which it is judged whether SWATNP indicating the N or P range or SWATPR indicating the R range is 1. If the result is affirmative, the procedure moves to S1008 in which the current gear is determined to be fourth gear and the subroutine is concluded after execution of step S1004.

If the result is negative and it is judged that the D range is selected, the procedure moves to step S1010 in which it is judged whether the gear position SA indicated by the ON/OFF pattern of the solenoid valves 36 and 38 coincides with the current gear position $S_O$. Normally, they are found to coincide, so that the procedure advances to step S1012 in which the "shifting in progress" flag FSFTING is found to be 0 (shifting not in progress), to step S1014 in which the timer SOLMOVE is reset to zero, to step S1016 in which it is judged that SOLMOVE<TOUT (TOUT will be explained later), and to S1018 in which the timer TSFTMOVE is reset to zero and the subroutine is concluded. In this case the gear position indicated by the solenoid ON/OFF pattern is determined to be the current gear.

When the solenoid ON/OFF pattern changes because of the issuance of a gear shift command, the result of the judgment in step S1010 is negative and in this case the procedure moves to step S1016 in which the timer value TSOLMOVE is compared with a prescribed value TOUT. The timer value TSOLMOVE indicates the amount of time that has lapsed since the last change in the solenoid ON/OFF pattern and TOUT is the period of time required to pass before the next gear shift command can be accepted. When it is found in step S1016 that TSOLMOVE≧TOUT, meaning that the release of hydraulic pressure is nearing completion, the procedure advances to step S1020 in which the timer value TSFTMOVE is compared with a prescribed value TIN. The timer value TSFTMOVE indicates the amount of time that has lapsed since the start of gear shifting and TIN is the period of time between the setting of the "shifting in progress" flag bit to 1 and the resetting of this bit. More specifically, it is the period of time up to the point where hydraulic engagement of the next gear is completed. At first it is found in step S1020 that TSFTMOVE<TIN and the procedure moves to step S1022 in which the flag FSFTING indicating whether or not gear shifting is in progress is set to 1. Since as indicated in step S20 of the main routine shown in FIG. 3 shifting for engagement with the next gear is in progress at this time, there would be no meaning in determining a gear shift command and, therefore, the determination of a gear shift command is not conducted. The gear position is defined as the next gear indicated by the ON/OFF pattern of the solenoids.

After it has been confirmed in step S1020 that the period of time TIN has passed, the procedure advances to step S1024 in which the "shifting in progress" flag is reset and the current gear position $S_O$ is defined as the target gear OBJSHT. The target gear OBJSHT will be explained later.

Figure 26:
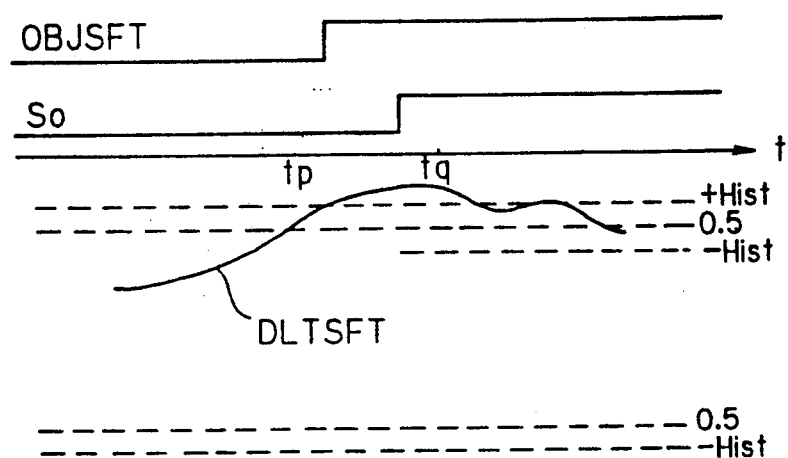
FIG. 26 is a graph for explaining a threshold value used for determination of the target gear.
Figure 27:
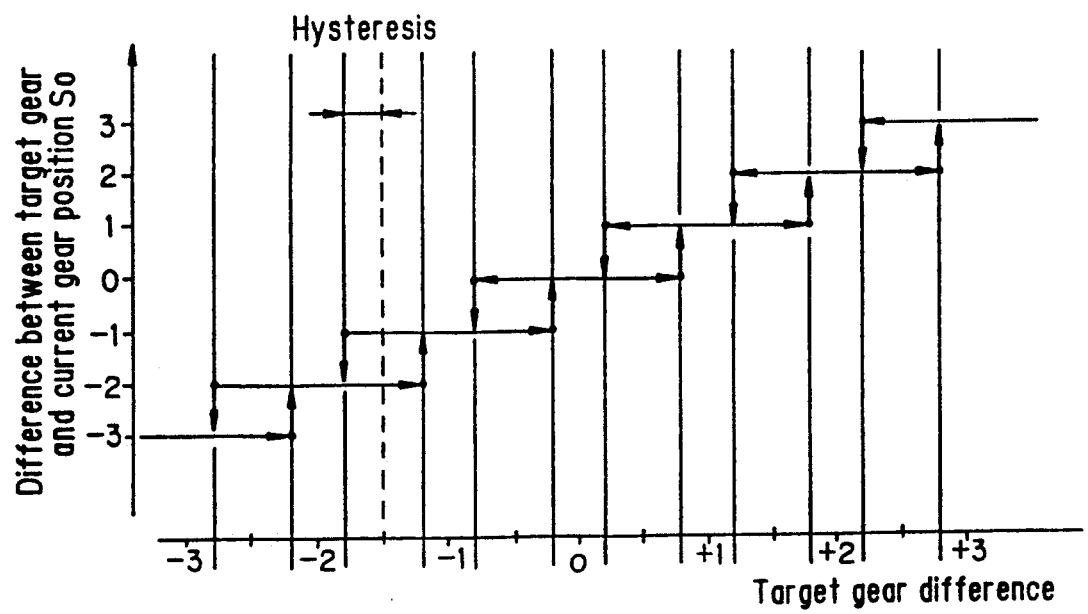
FIG. 27 is a graph for explaining hysteresis characteristics used for determination of the target gear.

Returning to FIG. 24, the procedure advances to step S902 in which it is judged whether DLTSFT (difference between current gear position and the target gear determined by the subroutine of FIG. 17) is positive or negative. If it is zero or positive, either the current gear is maintained or a shift-up operation is conducted. The procedure thus moves downward in the flowchart to step S904 in which OBJSHT—$S_O$ and ISFT are compared and if ISFT is equal to or larger than this difference, the procedure moves to step S906 in which the value obtained by adding 0.5 to the hysteresis Hist is defined as the threshold value TH. OBJSHT here is the target gear after calculation of the hysteresis (to be explained later), $S_O$ is, as defined earlier, the current gear position, and ISFT is the integer portion of the target difference (DLTSFT). This will be explained with reference to FIGS. 26 and 27. Referring first to FIG. 26 in which the current time is indicated as tp, since as determined in step S1024 of FIG. 25, OBJSHT and $S_O$ are equal at the current time tp, the difference between them is zero. If the target difference DLTSFT should be 0.8, then since the integer portion ISFT of this value is 0, we get 0 = 0 and the procedure advances to step S906. In order to prevent hunting during gear shift operations, hysteresis is ordinarily established on both the shift-up and shift-down sides. In the present embodiment, hysteresis is established as indicated in FIG. 27. In FIG. 27 this hysteresis is defined for the case of shifting up 1 gear position as 0.5 + a prescribed value Hist. For example, for 0.2 it becomes 0.2 + 0.5 = 0.7 and the result is used in step S906 as a threshold value TH required for shift-up.

In the next step S910, therefore, this threshold value TH is compared with the absolute value of RSFT (the decimal portion of DLTSFT). In this example, we get 0.8 > 0.7 and the procedure advances to step S912 where 1 is added to the integer portion ISFT of DLTSFT, to obtain 0 + 1 = 1. Thus in step S914 the target gear (after hysteresis calculation) OBJSHT is changed to the current gear + 1.

The procedure then advances to step S916 in which it is judged whether or not the target gear OBJSHT (after hysteresis calculation) is higher than the fourth gear and if it is, the procedure goes to step S918 in which the target gear SFTCOM (the target gear after hysteresis calculation and having been subjected to a limitation check) is limited to fourth gear. When the result in step S916 is that the target gear OBJSHT is not higher than the fourth gear, the procedure goes to S920 in which it is judged whether the target gear OBJSHT is lower than the first gear and if it is, target gear SFTCOM is defined as the first gear in step S922. If it is not, the procedure moves to step S924 in which OBJSHT is replaced with SFTCOM and the subroutine is temporarily discontinued.

In subsequent activations of the subroutine, if activation should occur at time tq in FIG. 26, for example, and the target difference at that time should be on the decrease and have reached 0.3, for example, the in step S902 will remain 0.3 > 0 and the procedure will advance to step S904 in which the right side will be 1 and the left side 0 so that the procedure will advance to step S908 in which the threshold value will be changed to TH = 0.5 − 0.2 = 0.3. As a result, the situation in step S910 becomes 0.3 = 0.3 and the procedure will pass through steps S914–S924 and out of this subroutine. The significance of this lies in the fact that, as shown in FIG. 26, the gear shift command value DLTSFT is apt to change frequently in response to the driving conditions so that it is possible that after issuance of a command value of, say, 0.8 for a shift-up by one gear position, the value may thereafter decrease to 0.3, for example. In such as case, if the threshold value should be maintained constant, a decision that was in the process of being made for a shift-up operation might be changed to a decision for holding the current gear (or to one for a shift-down operation). Thus, undesirable hunting would occur. In this embodiment, therefore, the threshold is set at 0.5 + Hist and is then changed to 0.5 − Hist, whereby no change is made in the command for shift-up insofar as the target difference in FIG. 26 does not fall below 0.5 − Hist.

The same principle applies when the target difference DLTSFT in the subroutine of FIG. 24 is in the downward direction (is negative). Specifically, change of the threshold value is conducted in step S930 during the time that the procedure passes through steps S926–S934, the target gear OBJSHT is changed in step S914, the limitation check is completed and the target gear SFTCOM is determined. In this case, once a shift operation to a lower gear has been decided, the threshold value is increased.

Returning to FIG. 19, the procedure advances to step S812 in which the final target gear is determined.

Figure 28:
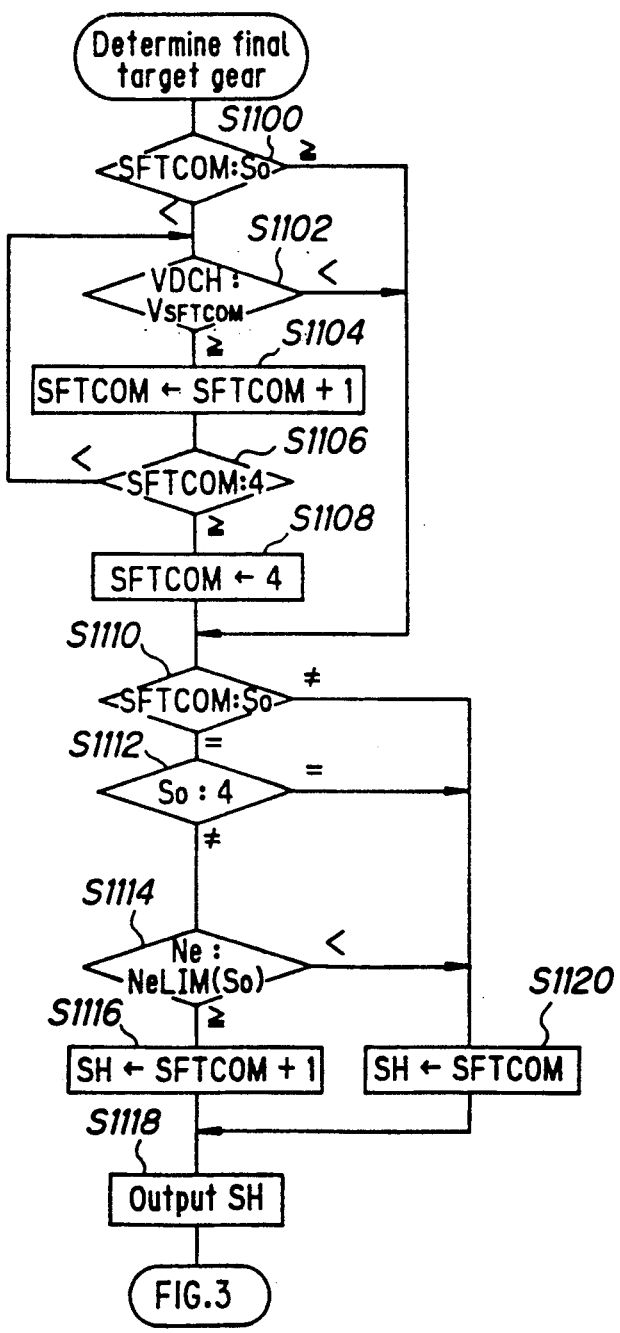
FIG. 28 is a flowchart showing a subroutine for determination of the final target gear in the subroutine of FIG. 19.

The subroutine for determining the final target gear is shown in FIG. 28. Here the once-decided target gear is subjected to a limitation check based on the metarules which, as mentioned at the beginning of the specification, reflect absolute decisions. For the most part, this is a recheck of the determined target gear in the light of mechanical factors related to the vehicle engine.

Two metarules are established in the present embodiment, both of which are for preventing excessively high engine speed:

1. If the vehicle speed is so high that the engine will obviously overrev when shifting down to the target gear, then shift the target gear up by one gear position.

2. If the target gear and the current gear are the same and the engine will overrev owing to increase in the engine speed if shift-up is carried out at a later time, then shift the target gear up by one gear position at the current time.

Figure 29:
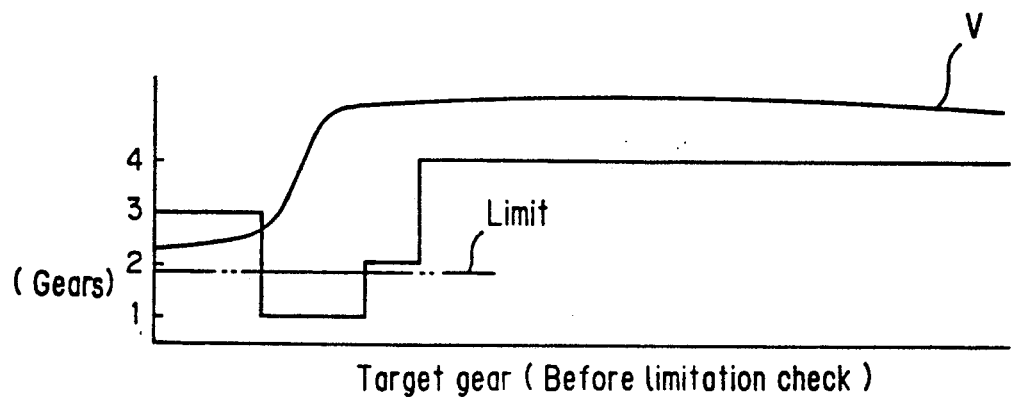
FIG. 29 is a graph for explaining a first limitation used in the subroutine of FIG. 28.

Case 1 is illustrated in FIG. 29. This is a rev limitation check on the kickdown side. If, for example, the current gear is third and the target gear is first and a shift-down from third to first gear is apt to cause overrevving because the vehicle speed is high, the target gear is changed to second gear.

Figure 30:
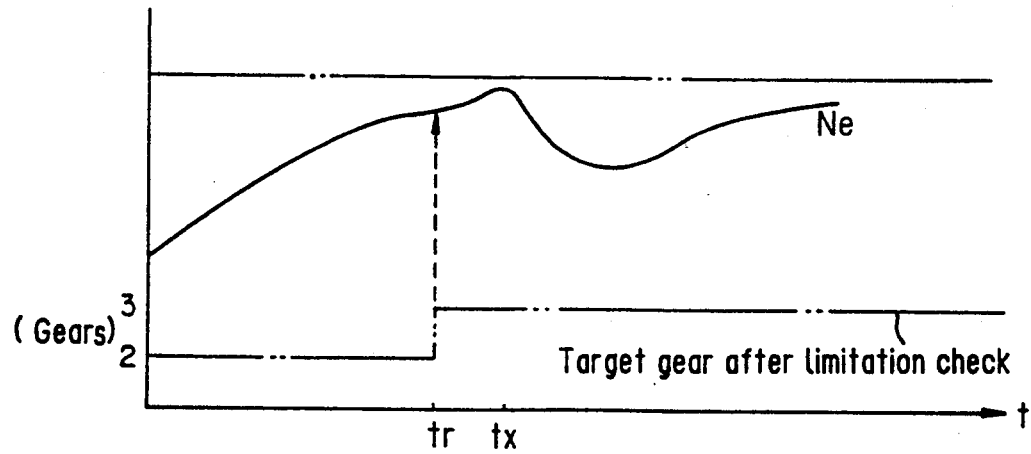
FIG. 30 is a graph for explaining a second limitation used in the subroutine of FIG. 28.

Case 2 is illustrated in FIG. 30. When a command for shift-up from second to third gear is not issued at the current time tr, if it is predicted that a shift-up operation at a later time will cause the engine speed Ne to increase and lead to overrevving at time tx, the target gear is raised to third gear at the current time tr.

Returning to FIG. 28, the procedure starts with step S1100 in which the target gear SFTCOM is compared with the current gear position $S_O$ and it is judged whether or not a shift-down situation exists. If a shift-down situation does exist, the procedure moves to step S1102 in which the vehicle speed VDCH is compared with the limit vehicle speed VSFTCOM in the target gear and if it is found that the vehicle speed is equal to or higher than the limit, the procedure goes to step S1104 in which 1 is added to the target gear to increase it by one gear position. The procedure then advances to step S1106 from which the procedure continues to loop until it is either judged that the target gear has reached fourth gear or confirmed that the vehicle speed has fallen to below the limit value. When it is found that the target gear has reached fourth gear, the procedure advances to step S1108 in which the target gear is made fourth gear, concluding the check, and then to step S1110 in which the shift direction of the target gear is reconfirmed. When it is judged in step S1102 that the detected vehicle speed has fallen below the limit vehicle speed (or is within the limit value from the beginning), the procedure skips to step S1110. It also skips directly to step S1110 when a shift-up situation is judged to exist in the first step S1100. Steps S1100–S1108 correspond to the limitation check 1.

When it is found in step S1110 that SFTCOM and $S_O$ are equal, i.e. when it is judged that the current gear is to be held, the procedure advances to step S1112 where it is judged whether or not the current gear is fourth gear and if the result is negative, the procedure goes to step S1114 in which the detected engine speed Ne is compared with the limit value NeLIM($S_O$) of the engine speed in the current gear. If it is the same or larger, the procedure advances to step S1116 in which the result obtained by increasing the target gear SFTCOM by one gear position is determined as the final target gear SH for output in step S1118. When the current gear is found to be the fourth gear in step S1112, if it is judged in step S1114 that the detected engine speed is lower than the limit engine speed, the procedure goes to step S1120 in which the target gear SFTCOM is determined as the final target gear SH. Since no limitation check is required in this subroutine when the target gear is a higher gear, the target gear is replaced with the final target gear in step S1118 and the subroutine is concluded.

As will be understood from the foregoing description, the present embodiment is arranged such that the control know-how used by the driver of a vehicle with a manual transmission, particularly the qualitative control know-how of an expert driver of such a vehicle, is expressed quantitatively through the use of fuzzy sets and that the number of rules is minimized by using fuzzy production rules that are, in line with the different categories of decision-making of a human driver, divided into those which apply to decisions throughout the whole range of driving circumstances and those which apply to decisions for adapting to circumstances, by using these production rules as a knowledge base for fuzzy reasoning and by rechecking the values obtained through this reasoning against rules prescribing limitations based on the vehicle mechanics. As a result, the rules can be easily modified and since the basic rules apply to the whole range of the control, the control itself is stabilized, the control system is simplified and the arithmetic and logical operations can be carried out more rapidly. Moreover, as the reasoning is conducted using rules, it becomes possible to realize control that is well matched to human feelings. Further, since weighted means are used and it is possible to move up two or more gears by the shifting operation, it is possible to determine highly appropriate control values.

While the invention was explained with respect to a multi-step transmission, it can also be applied for control of a continuously variable transmission as well as for traction control and the like.

A field test was conducted for comparing a vehicle equipped with a control system according to the embodiment described above with a vehicle equipped with a conventional automatic transmission control system.

The test was conducted in Japan on a road passing through a mountainous area, the particulars of which are given below:

(1) Course length 12.3 km
(2) Altitude 945.5 m (Max. 950 m, Min. 4.5 m)
(3) Mean incline 8.9%
(4) Max. incline 10.1% a) Uphill Driving

Important indices of "riding comfort" during uphill driving include the number of shift operations and the total of all accelerator pedal strokes over the total distance traveled, the accelerator pedal depression distribution and the accelerator pedal operation speed distribution.

Figure 31:
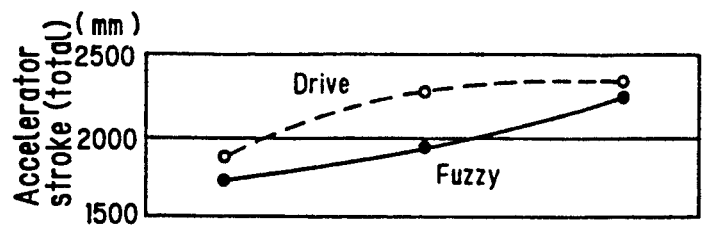
Figure 32:
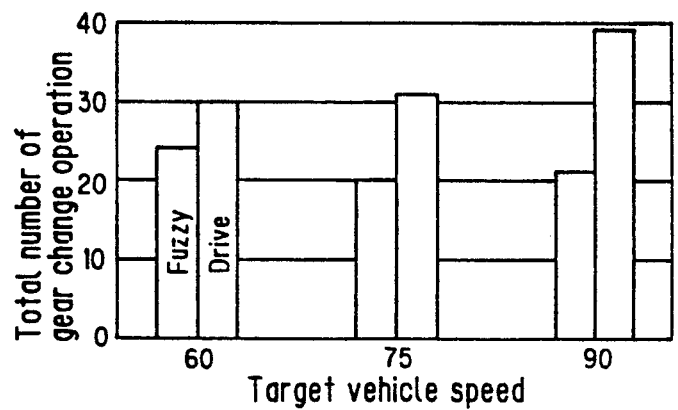
Figure 33:
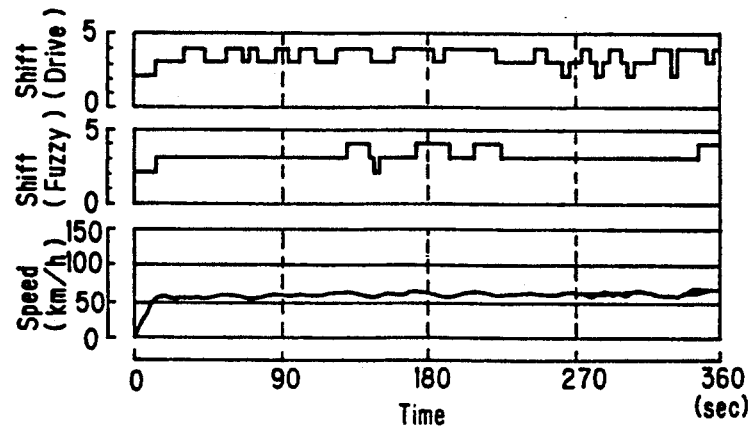

Three drivers (A, B and C) were instructed to drive the entire course, one in each vehicle, at target speeds of 60 km/hr, 75 km/hr and 90 km/hr, respectively. FIG. 31 shows the total of all accelerator pedal strokes (average for three drivers) and FIG. 32 shows the number of shift (gear change) operations. The driving condition for driver A traveling at a target speed of 60 km/hr is shown in FIG. 33. In these figures, "FUZZY" and "DRIVE" indicate the results obtained with the system according to the invention and the conventional system, respectively.

FIG. 34 shows the accelerator pedal depression distribution and the accelerator pedal operation speed distribution for driver A.

From the foregoing test results, it will be noted that the system according to the invention decreases the frequency of shift-downs due to insufficient reserve power and enables driving with fewer and more moderate accelerator pedal operations. It thus provides superb "riding comfort."

b) Downhill Driving

Indices of "reduced braking load" during downhill driving include the number of braking operations and the acceleration distribution during times when the throttle valve is completely closed. The fact that the throttle valve is completely closed indicates that the driver at least has no intention to accelerate. The number of brake operations by the three drivers is shown in FIG. 35 and the acceleration distribution for the driver A is shown in FIG. 36.

From the foregoing test results, it can be seen that the system according to the invention produces a larger decelerating force during complete throttle closure than does the conventional system, and is thus well matched to human feelings. Thus, as shown in FIG. 36, the number of occasions on which the brakes are used for forced deceleration is decreased, meaning that gear shifting that reduces the braking load is realized.

While the present invention has been explained with respect to a transmission having a finite number of gear positions, it will be understood that this is not limitative and that the invention can be applied to with like effect for the control of continuously variable transmissions (CVT) and further for Traction Control (ASR) or the like.

It should be, furthermore, noted that, while the above description discloses preferred embodiments of the invention, numerous modifications or alterations may be made without departing from the scope of the invention as set forth in the following claims.

What is claimed is:

1. A system for controlling a vehicle automatic transmission, comprising:
   first means for determining operating parameters of said vehicle at least including a degree of throttle opening, a vehicle speed and a current gear ratio;
   second means for carrying out a first fuzzy reasoning based on a fuzzy production rule to infer a driver's intention for changing at least one of said vehicle speed and said current gear ratio;
   third means for carrying out a second fuzzy reasoning based on a said first set of fuzzy production rules and a second set of fuzzy production rules with each set defining a gear ratio shift conclusion using at least one of said determined operating parameters and the inferred driver's intention to determine a target gear ratio to be shifted to; and
   actuator means for driving a gear ratio shift mechanism in response to said determined target gear ratio.

2. A system according to claim 1 wherein said first means further determines driving resistance.

3. A system according to claim 2 wherein said driving resistance is calculated by subtracting an amount equal to multiplying a weight of said vehicle by a value of acceleration of said vehicle from a calculation of motive force.

4. A system according to claim 1 wherein said driver's intention is a driver's intention to decelerate said vehicle.

5. A system according to claim 1 wherein said first means further determines vehicle acceleration.

6. A system according to claim 1 wherein said first means further determines vehicle speed during braking.

7. A system according to claim 1 wherein said first fuzzy production rule is comprised of a basic rule.

8. A system according to claim 1 wherein said second set of fuzzy production rules is comprised of extra rules.

9. A system according to claim 1 wherein said fuzzy production rule used in inferring said driver's intention is comprised of an extra rule.

10. A system according to claim 1 further including fourth means for, in accordance with a rule, checking to adjust said target gear ratio.

11. A system for controlling a vehicle automatic transmission, comprising:
    first means for determining operating parameters of said vehicle at least including a degree of throttle opening, a vehicle speed and a current gear ratio;
    second means for calculating driving resistance of said vehicle;
    third means for carrying out a first fuzzy reasoning based on a fuzzy production rule to infer a driver's intention to decelerate said vehicle;
    fourth means for carrying out a second fuzzy reasoning based on a first set of fuzzy production rules using said determined operating parameters and a second set of fuzzy production rules using said determined operating parameters, said calculated driving resistance and said inferred driver's intention to determine a control value of a target gear ratio to be shifted to;
    fifth means for checking and adjusting said determined control value in accordance with a rule; and
    actuator means for driving a gear ratio shift mechanism in response to said determined control value.

12. A system for controlling a vehicle automatic transmission of one of a multi-step geared type or continuously variable type and, comprising:
    first means for determining operating parameters of said vehicle;
    second means for carrying out a fuzzy reasoning based on a first set of fuzzy production rules directed toward general driving conditions and a second set of fuzzy production rules directed toward a specific driving condition, wherein said second set of fuzzy production rules uses said operation parameters relating to a driver's intention to change at least one of a vehicle speed and a current transmission gear ratio to determine a target gear ratio to be shifted to; and
    actuator means for driving a gear ratio shift mechanism in response to said determined target gear ratio.

13. A system for controlling a vehicle automatic transmission of one of a multi-step geared type and continuously variable type, comprising:
    first means for determining operating parameters of said vehicle;
    second means for inferring a driver's intention to change at least one of a vehicle speed and a current transmission gear ratio;

third means for carrying out a fuzzy reasoning based on a first set of fuzzy production rules directed toward general driving conditions using said determined operating parameters and a second set of fuzzy production rules directed toward specific driving conditions using said determined operating parameters and said inferred driver's intention to determine a target gear ratio to be shifted to; and actuator means for driving a gear ratio shift mechanism in response to said determined target gear ratio.

14. A system according to claim 13 further including fourth means for checking appropriateness of said determined target gear ratio in accordance with a predetermined rule which with respect to said first set and said second set of fuzzy production rules defines absolute limitation in shift control thereby modifying the selection of a target gear ratio to be shifted to and said actuator means drives said gear ratio shift mechanism in response to said checked target gear ratio.

15. A system according to claim 13 or 14 wherein said third means carries out said fuzzy reasoning to determine said target gear ratio by calculating a means value of said determined target gear ratios weighted by said membership functions of said fuzzy production rules.

16. A system according to claim 13 or 14 wherein said second means infers said driver's intention through a second fuzzy reasoning based on a membership function of parameters including at least one of said determined operating parameters in accordance with a third set of predetermined fuzzy production rules.

17. A system according to claim 16 wherein said third set of fuzzy production rules uses at least one of a degree of throttle opening, a vehicle acceleration and a vehicle speed during braking.

18. A system according to claim 13 wherein said inferred driver's intention is a driver's intention to decelerate said vehicle.

19. A system according to claim 13 wherein said second set of fuzzy production rules defines shift control during driving up or down a hill.

20. A system according to claim 19 wherein said second set of fuzzy production rules uses a parameter indicative of driving resistance.

21. A system according to claim 13 wherein said first set of fuzzy production rules uses at least one of a vehicle speed, a degree of throttle opening and a current gear ratio.

22. A system according to claim 13 wherein said second set of fuzzy production rules uses at least one of a driving resistance, a degree of throttle opening, a vehicle speed, a current gear ratio and a driver's intention to decelerate.

23. A system for controlling a vehicle automatic transmission of one of a multi-step geared type and continuously variable type, comprising:

first means for determining operating parameters of the vehicle;

second means for inferring a parameter indicative of a driver's intention to change at least one of a vehicle speed and a current transmission gear ratio;

third means for establishing a respective membership function of said parameters in accordance with a first set of a plurality of predetermined fuzzy production rules directed toward general driving conditions and a second set of a plurality of predetermined fuzzy production rules directed toward specific driving conditions each defining a respective gear ratio shifting conclusion;

fourth means for assigning a respective number to said parameters and said membership functions to identify them;

fifth means for carrying out fuzzy reasoning based on said fuzzy production rules to determine a target gear ratio to be shifted to; said fifth means calculating a respective value of said membership functions using said numbers assigned to said parameters and said membership functions and determining said target gear ratio to be shifted to based on said membership values and said gear ratio shifting conclusions of said fuzzy production rules; and actuator means for driving a gear ratio shift mechanism in response to said determined target gear ratio.

24. A system according to claim 23 wherein said fifth means determines said target gear ratio by calculating a mean value of said gear ratio shifting conclusions of said fuzzy production rules weighted by said values of said membership functions.

25. A system for controlling a vehicle automatic transmission of one of a multi-step geared type and continuously variable type, comprising:

first means for determining operating parameters of the vehicle;

second means for inferring a parameter indicative of a driver's intention to change at least one of a vehicle speed and a current transmission gear ratio;

third means for establishing a respective membership function of said parameters in accordance with a first set of a plurality of predetermined fuzzy production rules directed toward general driving conditions and a second set of a plurality of predetermined fuzzy production rules directed toward specific driving conditions with each of said fuzzy production rules having an antecedent and a consequent, the rule consequent defining a gear ratio shifting conclusion;

fourth means for carrying out fuzzy reasoning based on said fuzzy production rules to determine a target gear ratio to be shifted to, by calculating a respective minimum value of said membership function of said rule antecedent successively to obtain a product of said minimum value multiplied by said rule antecedent, by summing said products together and by then determining a gravity of said sum; and actuator means for driving a gear ratio shift mechanism in response to said determined target gear ratio.

26. A system according to claim 25, wherein said gravity is determined from a weight and a gravity in an abscissa of said consequent membership functions weighted by said values of said antecedent membership functions.

* * * * *